US007013289B2

(12) United States Patent
Horn et al.

(10) Patent No.: US 7,013,289 B2
(45) Date of Patent: Mar. 14, 2006

(54) GLOBAL ELECTRONIC COMMERCE SYSTEM

(76) Inventors: Michel Horn, 9747 Amberley Dr., Dallas, TX (US) 75243; Thomas Scott Manaugh, 9747 Amberley Dr., Dallas, TX (US) 75243

( * ) Notice: Subject to any disclaimer, the term of this patent is extended or adjusted under 35 U.S.C. 154(b) by 724 days.

(21) Appl. No.: 09/788,853

(22) Filed: Feb. 21, 2001

(65) Prior Publication Data

US 2002/0156688 A1 Oct. 24, 2002

(51) Int. Cl.
G06F 17/60 (2006.01)

(52) U.S. Cl. .............................. 705/26; 705/27; 707/4; 707/103 R; 707/104.1; 709/203

(58) Field of Classification Search ................. 705/26, 705/27, 35, 7; 709/224, 203; 707/2, 3, 5, 707/6, 101, 104, 200, 4, 10; 713/60
See application file for complete search history.

(56) References Cited

U.S. PATENT DOCUMENTS

| | | |
|---|---|---|
| 5,442,782 A | 8/1995 | Malatesta et al. |
| 5,630,125 A | 5/1997 | Zellweger |
| 5,745,681 A | 4/1998 | Levine et al. |
| 5,835,912 A | 11/1998 | Pet |
| 5,895,454 A | 4/1999 | Harrington |
| 5,905,973 A | 5/1999 | Yonezawa |
| 5,940,807 A | 8/1999 | Purcell |
| 5,944,790 A | 8/1999 | Levy |
| 6,029,141 A * | 2/2000 | Bezos et al. ................... 705/27 |
| 6,038,598 A | 3/2000 | Danneels |
| 6,055,515 A * | 4/2000 | Consentino et al. .......... 705/27 |
| 6,061,682 A * | 5/2000 | Agrawal et al. ............... 707/6 |
| 6,064,979 A | 5/2000 | Perkowski |
| 6,115,690 A | 9/2000 | Wong |
| 6,233,575 B1 * | 5/2001 | Agrawal et al. ................ 707/6 |
| 6,292,894 B1 * | 9/2001 | Chipman et al. ........... 713/168 |
| 6,411,999 B1 * | 6/2002 | Tinkler ........................ 709/224 |
| 6,446,061 B1 * | 9/2002 | Doerre et al. ................... 707/3 |
| 6,460,020 B1 * | 10/2002 | Pool et al. ..................... 705/26 |
| 6,484,149 B1 * | 11/2002 | Jammes et al. ............... 705/26 |
| 6,606,619 B1 * | 8/2003 | Ortega et al. .................. 707/2 |
| 6,704,729 B1 * | 3/2004 | Klein et al. .................... 707/5 |
| 6,721,715 B1 * | 4/2004 | Nemzow ...................... 705/26 |
| 2001/0037253 A1 * | 11/2001 | Kensey ........................ 705/26 |

(Continued)

FOREIGN PATENT DOCUMENTS

WO    WO 20046693 A2 *  8/2000

OTHER PUBLICATIONS

U.S. Provisional Patent Application No. 60/187,252, filed Mar. 6, 2002.*

(Continued)

*Primary Examiner*—Yogesh C. Garg

(57) ABSTRACT

A comprehensive system effectuates global electronic commerce on the Internet across frontiers of nations, cultures, and languages. Referral Websites serving various locales offer Buyers the opportunity to view products for purchase. A Buyer selects categories of products for viewing by using drop-down menus that organize products into a clear taxonomy that can be expressed across all languages. Having selected a category of products for viewing, a Buyer receives, from a multi-version relational database, a version of marketing information about each product. The version is one automatically sent from the database to match the Buyer's language, culture, and nationality, as deduced from the use of a particular Referral Website. A shopping cart allows Buyers to select a product for purchase in an interactive way that encourages completion of the purchase. Products can be offered with custom options and in wholesale quantities. Personalized Web pages allow comprehensive customer service after a sale.

1 Claim, 2 Drawing Sheets

U.S. PATENT DOCUMENTS

| | | | |
|---|---|---|---|
| 2002/0032626 A1* | 3/2002 | DeWolf et al. | 705/35 |
| 2002/0069096 A1* | 6/2002 | Lindoerfer et al. | 705/7 |
| 2002/0107861 A1* | 8/2002 | Clendinning et al. | 707/101 |
| 2002/0184308 A1* | 12/2002 | Levy et al. | 709/203 |

OTHER PUBLICATIONS

Ebbens, S., & Marshall, G., Designing a Globalized and Localizable Web Site, http://msdn.microsoft.com/workshop/management/intl/designloc.asp, Microsoft Corp, Aug. 27, 1999.

Kaplan, M., Go Global: Designing your ASP-based Website to Support Globalization, Microsoft Internet Developer (MIND), http://www.microsoft.com/mind, Jul., 2000.

Nolan, C., Put Advanced SQL Server Features to Work, MIND, Microsoft, http://www.microsoft.com/mind, Mar., 1999.

Rodenburg, J., Internet Information Services 5.0, Microsoft Internet Developer (MIND),http://microsoft.com/mind, Apr., 1999.

Tabini, M., Using Stored procedures in SQL Server, Microsoft Internet Developer (MIND), http://www.microsoft,com/mind, Mar., 1999.

Vasilyev, K., Multilingual Web Site Development, Microsoft Internet Developer (MIND), http://www.microsoft.com/mind, Jan., 2000.

* cited by examiner

GLOBAL ELECTRONIC COMMERCE SYSTEM

CROSS-REFERENCE TO RELATED APPLICATIONS

This application claims the benefit of invention Disclosure Document No. 473206, filed with the U.S. Patent and Trademark Office on Apr. 27, 2000, entitled DYNAMIC, INTERACTIVE PERSONAL WEBSITE AUTOMATICALLY CONSTRUCTED AS A CONSEQUENCE OF A PURCHASING ACTION—THE WEBSITE PROVIDING TIMELY AND COMPREHENSIVE CUSTOMER SERVICE TO AN INDIVIDUAL BUYER.

BACKGROUND OF THE INVENTION

1. Field of Invention

The field of this invention is global sale of products and services using electronic means of (a) communications, (b) data storage and retrieval, (c) taking of orders, (d) fulfillment, (e) transfers of payments, and (f) providing customer service after the sale. Both business-to-business and business-to-consumer sales are effectuated.

The present invention is a system for use by even small manufacturers to meet a long-felt need to sell their products to Buyers around the world. The term "manufacturers" is meant to include manufacturers or authorized distributors for manufacturers; and the term "Buyers" is meant to include both individuals and organizations, including other manufacturers.

A complete system, termed a Global Store, is disclosed, a system that overcomes barriers to global trade of language, culture, and nationality. The Global Store integrates communications and database software technologies, hardware infrastructure, and operating methods to market and sell products from manufacturers around the globe to Buyers in a multitude of locales around the globe. Stated another way, The Global Store assembles and operates various subsystems to provide the infrastructure for manufacturers to use a new channel of global commerce, a Virtual Channel.

2. Discussion of Prior Art

Overview of the Legacy Channel and of Conventional E-Commerce

Typically, manufacturers, working on their own, market their products effectively only to one specific population of Buyers defined by a country, language, and culture. There are obvious exceptions seen in giant international companies such as Coca Cola (RTM) or Adidas (RTM), but those exceptions represent a tiny fraction of what could be done, and will be done, as even small manufacturers surmount barriers to international trade.

For manufactures who do not have their own giant global marketing system, a presently available "Legacy Channel" for global commerce is manned by an array of players (e.g., exporters, importers, wholesalers, and retailers) who provide a multitude of necessary functions of marketing, sales, payment processing, delivery, and customer service. Manufacturers could conceivably market their products to Buyers around the world by performing all of the above necessary functions themselves, but practical considerations usually cause the manufacturer to outsource many functions of global commerce to the Legacy Channel.

In the future, however, the Legacy Channel will be largely replaced by the new Virtual Channel. That revolutionary change will provide ready access to global markets for even small manufacturers. Furthermore, those manufacturers will be able to maintain control, like never before, over the marketing of their products.

Revolutionary changes come about by a confluence of events. For example, a revolutionary use of rocket ships for manned exploration of space in the mid-Twentieth Century resulted from a confluence of political motivations and technological advances that included, but were not restricted to, international competition between superpowers and advances in rocketry. Improvements in space-age materials, rocket engines, computers, and other technologies also set the stage for the revolutionary change.

A similar situation now exists in the area of global trade. A confluence of recognized needs and new technologies now sets the stage for a revolutionary change in how manufacturers bring their products to markets around the world.

Advances in communications and information technology and their associated standards have made geography a much less salient factor in trade than in prior years. Electronic communications at the speed of light enables one to purchase a product on the other side of the world as quickly as across the street—even more quickly should one decide to walk across that street to make the purchase. Furthermore, increasing use of English as a de facto language of commerce and increasing access to good, real-time translation technology will inevitably lower language barriers.

The Global Store system, described here, is a method that integrates revolutionary and evolutionary developments into a new system of global trade in the Virtual Channel. Only in the very recent past have the following compelling trends and powerful developments conjoined to permit the construction and operation of a complete and integrated system of global trade to meet long-felt needs:

1) a quickly growing population of Internet users around the world who are ready to shop online 24 hours per day and 365 days per year,
2) Websites to provide specialized functions such as online payments, online currency conversion tables, universal tax tables, and parcel tracking,
3) third-party fulfillment services to support regional and global distribution,
4) "pull" online marketing that allows customers greater opportunities to customize the products they purchase, as compared with the "push" marketing of ready-made products that is characteristic of brick-and-mortar retail channels,
5) international agreements to eliminate tariffs on imports,
6) globalization of sources of supply,
7) efficiencies and economies of scale resulting from consolidation of marketing functions across markets,
8) establishment of ubiquitous delivery services,
9) availability of escrow services to assuage concerns of online Buyers about completing purchases after shopping baskets are filled,
10) growth in telecommuting to work and in home-based internet businesses, allowing participants to avoid driving and, thereby, less occasion to stop at brick-and-mortar stores to shop,
11) increased global travel and increased access to information from around the world using wide-band communications, thereby increasing interest in products from far-away locales,
12) consolidation of warehousing and distribution centers for quicker and more efficient fulfillment of orders,
13) manufacturers' need to retain brand control by offering increasing levels of customer support from a single point, 14) technology to implement Web-based multi-language global marketing systems using newly invoked international standards, locale-specific stored SQL procedures, integrated multi-locale Web-based relational data bases, and Unicode, and 15) integration of manufacturers' Business-to-Consumer sales with their Business-to-Business strategies for procuring supplies, offering a means to couple direct online customer sales with procurements, thus completing the transition to a completely integrated "Pull" model: A custom product is created to satisfy a Buyer's needs, and suppliers are enabled to provide necessary Business-to-Business products and services on a timely basis.

Pent-up pressures for globalization have produced numerous examples of conventional e-commerce businesses attempting to expand globally. These businesses generally meet the challenge to provide information in multiple languages and across cultures by cloning Websites from one locale to another—reproducing some of the design of the original Website and some of the content. This multi-headed e-commerce approach is a crude interim step that fails to meet the emerging needs of manufacturers who desire global sales. Loss of the efficiencies and economies of a truly global approach make the prices of their products less competitive than should be possible, and there is the additional problem of entering and maintaining current and accurate information across multiple databases.

In conventional e-commerce it is not uncommon for the unscrupulous to sell brand name goods through Websites when they are not authorized to do so. In response, manufacturers desire to maintain better control of prices, marketing information about their products, sales, fulfillment, and customer service—all in a global context and, ideally, from a single integrated site.

Buyers are reluctant to make international purchases when they fear that they will have no practical recourse if they pay for a product but either do not receive it or find the product is not acceptable. What is needed for a hesitant Buyer is an escrow service that will complete settlement only after the product has been successfully delivered and the Buyer is satisfied.

Many conventional e-commerce Websites have sought to sell products globally, but few if any have made a serious commitment to globalization by providing good translations in multiple languages. (So far, machine translations are so lacking in accuracy and idiomatic expression that they are likely to inspire mirth rather than confidence in a Buyer.) Furthermore, no site offers products of a multitude of manufacturers along with customer support across more than one language, support that is needed for Buyers to be well informed about international shipping, duties, warranties, currency conversion, repair centers, and other issues important to Buyers.

Conventionally, for both e-commerce and brick-and-mortar businesses, separate databases are established to support production, marketing, sales, and accounting. Information changes in one business database often are not reflected in all of the other databases. Further information vital to a customer, such as parcel tracking, would require leaving the e-commerce site to access such a service on yet another system. Customer support is critically lacking in brick-and-mortar businesses and also is missing in most e-commerce businesses. What is missing is the ability to place in the hands of the customer the ability to go to a single location and, interactively, to obtain an answer to a question pertaining to a product or to an order.

Departing from conventional e-commerce approaches, the ideal e-commerce model, from the manufacturers' viewpoint, is to sell globally using a system allowing 1) a single database of product descriptions in common format to be translated for Buyers across different languages,
2) Buyers to come to a single, authorized Global Store with a single Web URL address,
3) global sales across many locales using an information system operating in a multitude of languages to provide product information assembled for each specific locale,
4) a generalized, reliable approach to shipping, currency conversion, settlements, and customer support,
5) global sales without losing brand control,
6) minimal delays in bringing new products to market or old products to new markets,
7) the manufacturer to take orders for custom-made products, using a "pull" method,
8) fulfillment from a plurality of strategically-located fulfillment centers around the Globe, and
9) Buyers to get information on the Buyers' transaction history and to find links to manufacturer's support from a single Website.

Prior art in the area of electronic commerce has not yet provided a flexible system to use a single, central database to support sales to Buyers around the world. Rather, prior art is exemplified by the design of large international e-commerce companies like Amazon and eBay that clone existing non-global electronic systems of marketing (e.g., Amazon.com) into similar but separate systems that serve various locales (e.g., Amazon.co.uk). Products are separately catalogued and inventoried in the separate, cloned online businesses serving a particular language and locale. Efficiencies and economies of scale are largely lost when marketing becomes thus fragmented. Furthermore, Buyers lose the benefit of an expanded selection of products coming from all locales.

In summary, the Legacy Channel of global trade is not practical for most businesses. Furthermore, as will be described below, the promise of global e-commerce in a Virtual Channel of global trade to supplant the Legacy Channel has not yet been realized; efforts have thus far failed sufficiently to integrate existing art and new art to capitalize on new trends and developments. The invention disclosed here overcomes the shortcomings of prior art by making e-commerce a viable method of global trade for even small manufacturers.

E-Commerce and Database Technology

The Global Store system uses a multi-version database to provide a new way of providing language/locale-specific marketing information and sales of products to Buyers around the globe. Prior art, as seen in patents cited below, provide opportunities for Buyers to (a) view a product and be referred to a seller or (b) view and purchase a product over the Internet, with or without use of a referrer Website. However, no prior art takes advantage of (a) multi-version, locale-specific innovations in marketing, (b) use of Referral Websites from a multitude of locales, combined with (c) other Ancillary Resources to offer truly global sales over the Internet.

Single-Point Global E-Commerce

Prior art has not solved the problem of marketing globally from a single-point. Major players in global e-commerce (e.g., AOL, Yahoo, and Amazon) have adopted a country-by-country or a region-by-region strategy in order to adapt to Buyers' languages and cultures.

In a statement quoted in a Wall Street Journal article, Aug. 01, 2000, a Yahoo executive declared that Yahoo would consider itself unsuccessful if Yahoo were considered an American company two years from then. Yahoo and other e-commerce companies have discovered that their widely recognized brand names are, in themselves, not sufficient for attracting global e-commerce business. Buyers have been found, however, to be attracted to e-commerce sites that cater to local interests and culture. Stated another way, Buyers are more comfortable and confident about buying from a business they do not perceive as foreign.

Needed is a system to provide culture-sensitive and language-adapted marketing, sales, and customer service content to Buyers, doing so in a way that takes advantage of the efficiencies and economies of using a single point of operations. Prior art, described as follows, fails to meet that criterion:

Chelliah et al (U.S. Pat. No. 5,710,887"Computer System and Method for Electronic Commerce," 1998) disclose a multi-vendor shopping system. They describe a method for a presentation to a customer of at least one supplier for selection. Similarly, items from a supplier or suppliers can be displayed for the customer to view. Associated with a supplier of such items is an item database including information on presented items. A pricing means allows reception of information from the item database to determine the cost associated with a presented item. In addition, a customer information database stores information relating to the customer. The system also comprises means for creating a customer-monitoring object for each customer. The Commerce Subsystems include: an Incentives Subsystem; an Observations Subsystem; an Order Fulfillment Subsystem; a Participant Subsystem; a Payment Handler; a Pricing Subsystem; a Product Database; a Promotions Subsystem; a Sales Representative Subsystem; a Redemption Registry; a Security Subsystem; a Shipping Subsystem; and a Tax Subsystem.

The patent by Chelliah et al discloses a relatively comprehensive e-commerce system operating from a single point, but still it fails to meet a basic need of global commerce to provide alternative versions of marketing information for Buyers across linguistic and cultural groups; it can only accommodate Buyers who speak a given language.

The same limitation is seen in the recent patent by Wong (U.S. Pat. No. 6,515,690 "Integrated business to-business Web commerce and business automation system," 2000). Wong makes a strong case for the advantages in efficiency and speed of using a single, integrated database for businesses, and especially Web-based businesses. However, his patent makes no accommodation to differences in language or customs for users of the database. The Global Store system disclosed here overcomes that limitation. Also disclosed are other innovations not seen in the Wong patent, the Chelliah et al patent, or in other prior art:

(1) a clear and efficient way to categorize products to be displayed to Buyers, (2) an order-taking shopping cart subsystem that encourages Buyers to complete a purchase transaction by keeping products selected for purchase in the Buyer's view and by interactively involving the Buyer in a purchasing process, and (3) a means to provide comprehensive customer service information from a single convenient point.

Accommodating Buyers using a diversity of languages and additional needed innovations are discussed below in the context of related prior art.

Prior Art Using a Single Multilingual Database

Prior art has not provided a solution for global e-commerce from a single point, but several patents have described innovations in database technology that might be used to accommodate visitors to an e-commerce Website when they speak a diversity of preferred languages:

1) Pet's patent (U.S. Pat. No. 5,835,912 "Method of Efficiency and Flexibility Storing, Retrieving, and Modifying Data in Any Language Representation," 1998) discloses a method of storing, retrieving, and modifying multilingual data in a database by creating data records in a user-definable language representation. Each data record has an identifier, where each data record includes data fields and attribute fields, where each data field and attribute field is identified by a name. Each data field and attribute field is stored on a separate line in a data item table along with the data record identifier, the field name or attribute name, and a language representation identifier. A data record, data field, or attribute field is retrievable in the language representation used to store the same. Modifying, adding, or deleting the data record, the data field, or the attribute field may be accomplished using a user-definable language representation where the language representation may be different from the language representation used to store the item.

2) A patent by Malatesta et al (U.S. Pat. No. 5,442,782 "Providing Information from a Multi-Lingual Database of Language-Independent and Language-Dependent Items," 1995) discloses a method of internationalizing a database by storing data in one language, referred to as a base language, along with copies of the data in one or more languages other than the base language. The base language is relative to the user. That is, a base language for one user may be different from the base language of another user.

The above two patents suggest the feasibility of providing from a single database information to users who speak different languages. However, in neither of these patents is there disclosed a system that comprehensively accommodates to the needs of a Buyer to view, purchase, and receive products from around the world, using the Buyer's own language in a manner that will not seem foreign to the Buyer. Needed is a method for multiple versions of marketing information to be automatically and transparently delivered from a single database. That database, when incorporated into a complete system for global e-commerce, would thereby accommodate Buyers from around the world Determining a Visitor's Preferred Language at a Multilingual Website In a recent patent (U.S. Pat. No. 6,038,598 "Method of Providing One of a Plurality of Web Pages Mapped to a Single Uniform Resource Locator (URL) Based on Evaluation of a Condition," 2000) Danneels suggested that various language versions from a single source on the Web could be delivered selectively to viewers. The selection is based on information transferred from the viewers' Browsers along with a request to view Web page content. Unfortunately, that approach is not valid unless a viewers' Browser is programmed to send preferred language and preferred character set information along with a request. Given that Browsers are not uniformly programmed to send that information, the Danneels' approach is not a strong contender as a general solution for automatically and transparently identifying a preferred language for a viewer.

Another approach is suggested in a patent by Levy (U.S. Pat. No. 5,944,790 "Method and Apparatus for Providing a Web Site Having a Home Page that Automatically Adapts to User Language and Customs," 1999). Levy presents a system whereby a generic home page is delivered in various language versions based on the location code of the viewer's node address. Thereafter, the viewer is given the opportunity to specify the language to be used for viewing other Web pages. There are several problems with this approach, as follow:

1) An extra step requiring the visitor to specify a language choice is introduced prior to the viewer accessing the content desired by the Client.
2) No provision is made to determine the character set used by the viewer's Browser.
3) This approach is not transparent with respect to language usage determination. Because the viewer is involved in language selection, there is an obvious limitation to making the viewer comfortable that the site is not foreign.
4) Levy fails to show how the viewer's node address is actually used to determine the viewer's presumed locale and preferred language.

The limitations seen in the patents by Danneels and Levy could be overcome when a preferred language is determined by a Buyer's use of a locale-specific Referral Website.

Use of Referral Websites

Prior art, described below, has described use of referral Websites, but none has used the locale of Referral Websites to determine a viewer's locale and preferred language.

Harrington (U.S. Pat. No. 5,895,454 "Integrated Interface for Vendor/Product Oriented Internet Websites," 1999) describes a referral Website that has access to a database of products/services that are available from a multitude of vendors in remote locations. Buyers can access and purchase products in the database, doing so via an interface provided by the referral Website to the vendors' remote Websites. After the Buyer interactively connects with one or more of the remote vendor network sites, the user selects products/services from the information provided on the remote vendor network site. The selection of a particular product/service triggers a transaction notification that records the Buyer's selection and associated financial transaction data, which is transmitted to the database and associated database interface. Harrington's design does not allow for global sales because her referral Website only puts Buyers using a single language in contact with a vendor using the same language. Thus, there is no attention paid to even the first step necessary for global sales.

Bezos et al (U.S. Pat. No. 6,029,141 "Internet-based Customer Referral System," 2000) describe an Internet-based customer referral system that allows referral Websites to receive commissions on sales made to Buyers when they refer those Buyers to an e-commerce Website. These referral Websites are not identified, however, by the language and locale with which they are associated. Therefore, this design does not allow Buyers to get customized treatment that caters to their language or culture. All Buyers coming to the e-commerce Website from referral Websites see a site that is oriented toward a single language and culture. Needed is a system whereby a Buyer's use of a Referral Website (among many Referral Websites serving multiple locales) is used to determine and accommodate to the Buyer's preferred language and to the customs of the Buyer's locale.

Use of Shopping Carts for E-Commerce Websites

Buyers use shopping carts on e-commerce Websites to store a list of products selected for later purchase. There is a significant problem, however; very often, a Buyer places one or more items in a shopping cart but then abandons the cart without completing a purchase. In a study described in the Dallas Morning News, page 4 D, Oct. 2, 2000, Datamonitor, a New York-based market research firm, found that 78% of all online shopping carts are abandoned before checkout.

Any improvement made in the percentage of shopping cart users who go on to complete a purchase would have tremendous positive influence on the success of an e-commerce site.

Unfortunately, prior art has failed to incorporate good, common sense sales techniques into the design of shopping cart functions.

The following patents are discussed in light of certain failures in support of the sales process—limitations that are overcome in the present invention:

Levine et al (U.S. Pat. No. 5,745,681 "Stateless Shopping Cart for the Web," 1998) disclosed a shopping cart system that allows a hidden shopping cart file to be placed in a page sent to a Buyer that displays products for purchase. The Buyer can toggle the hidden file into view. This elegant technological design allows use of a shopping cart without opening a new window. Though Levine et al show technical innovativeness, the use of a hidden file is exactly the opposite of what is needed to stimulate payment for selected items. It is actually better to keep a shopping cart file displayed in an open frame to remind the Buyer about the products selected. Hidden from view, the selected products are more easily forgotten and abandoned.

Yonezawa et al (U.S. Pat. No. 5,905,973 "Shopping Basket Presentation Method for an Online Shopping System," 1999) provide a persisting open shopping cart window from the outset of a Buyer's viewing of products, but there is a failure to provide total cost, including shipping. This is a significant failure because not knowing total cost means that a Buyer does not have the information needed to make a buying decision. It would actually be an advantage to involve the Buyer in a purchasing process by asking the Buyer to provide a destination for a purchased product, thereby allowing the calculation of shipping costs and total costs. That sort of interaction would help to cement in the mind of the Buyer the Buyer's interest in buying the product.

Use of a Personalized Web Page for Comprehensive Customer Service

Relevant prior art to this invention would describe comprehensive customer service from a single point with one or more of the following features:

1) Access by a Buyer to a customer service Web page in the Buyer's own language and in the proper character set,
2) Dynamically current, event-driven provision of information from a single, integrated database,
3) Personalization by allowing a Buyer to access information about past transactions, current orders, and parcel tracking,
4) Access to after-the-sale information about purchased products, including recalls, repair centers, accessories, warranties, and instructions,
5) Information about contacting customer service representatives, and
6) Opportunities to participate in any current customer retention programs.

In totality, the above features would serve to enable the Buyer with a personalized Web-based Customer Information System, a level of service and integration that exceeds prior art. The following patents touch on one or more of the above features. No one patent describes a comprehensive approach.

Providing Buyers' access to a Web-based business' database system is a step demonstrated in a patent by Purcell (U.S. Pat. No. 5,940,807 "Automated and independently accessible inventory information exchange system," 1999). Purcell discloses a method for controlling the collection, processing and dissemination of information by a host regarding product and service availability. The method includes the step of establishing a host-operated information management system. Electronic communication connections to host-approved sellers of products and services are granted limited electronic access to the information management system. Each approved seller has a self-initiated, exclusive capability to access that seller's inventory information that is maintained on the information management system for adding, amending and deleting portions of the seller's inventory information. The seller's inventory information is analyzed and assimilated into a Buyer's listing of products and services available through the information management system to potential Buyers. Host-approved Buyers of products and services are granted limited electronic access to the information management system so that each approved Buyer may access the Buyer's listing for reviewing products and services of interest to that Buyer.

Perkowski (U.S. Pat. No. 6,064,979 "Method of and System for Finding and Serving Consumer Product Related Information Over the Internet Using Manufacturer Identification Numbers," 2000) discloses a Web-based method for finding and displaying consumer product-related information. A database serving subsystem stores manufacturer identification numbers assigned to manufacturers of consumer products, home-page specifying URLs symbolically linked to the identification numbers, universal product numbers (UPNs) assigned to consumer products made by the manufacturers, and product-information specifying URLs symbolically linked to the UPNs. During operation, a Client subsystem transmits to the database serving subsystem a request for information that includes the UPN assigned to the consumer product on which product-related information is being sought. The database serving subsystem automatically compares the UPN against the stored manufacturer's identification numbers and automatically returns to the Client subsystem one or more of URLs symbolically linked to the UPN if URLs have been symbolically linked to the UPN within the database serving subsystem. However, if no URLs have been symbolically linked to the UPN, then the database serving subsystem automatically returns the home-page specifying URL symbolically linked to the manufacturer's identification number contained within the UPN in the request. By virtue of this novel search mechanism based on manufacturers' identification numbers, Client subsystems are automatically provided with the home-page of the manufacturer's World Wide Web (WWW) site in situations where product-information specifying URLs have not yet been symbolically linked with the UPN on any one of the manufacturer's products. By this method, consumers may gain product information or, at least, information about a manufacturer when the consumer has the UPN code for a product of interest and the UPN and linked information has been made part of the database accessed by the consumer. Though this system makes clever use of UPNs and the Web to find information about some products, it does not enable a consumer with a guaranteed way of accessing product information for any given product that a consumer may have purchased. Furthermore, there is no provision to make information available in a language understood by the consumer.

Wong (U.S. Pat. No. 6,515,690 "Integrated Business-to-Business Web Commerce and Business Automation System," 2000) argues convincingly for the benefits of ready access to a single, integrated database for all workers inside a Web-centric business; and he includes the customer in the list of beneficiaries. Furthermore, a purchaser is allowed access to the database to check out important information: "Customers can retrieve previous quote records and view order and shipment status via the Web. . . . Parts tracking saves employee time that would otherwise be spent responding to customer inquiries, and also contributes to customer satisfaction through the convenient availability of timely information."

Though Wong describes an integrated business system in many respects, neither he nor others have yet described a system that optimizes a customer's access to relevant information. That is especially true when customers may vary in the languages they understand. Still needed, for either a business-to-business Buyer or an individual Buyer, is ready access to pertinent information at a language-compatible, single point. Pertinent information would include order status, shipment status, histories of prior transactions, warranties, return policies, and other information that could answer many questions for a Buyer without the Buyer ever needing to contact a customer service representative. That access would reduce both aggravation to the Buyer and costs to the seller. Furthermore, that information should be offered in the Buyer's own language. When a Buyer does contact a representative, any questions are likely to be resolved most quickly and with least misunderstanding when the Buyer and the representative are both able to review the same records on their respective computer screens.

Prior Art of Product Organization and Selection Using Menus

Zellweger (U.S. Pat. No. 5,630,125 "Method and apparatus for information management using an open hierarchical data structure," 1998) discloses a method for finding products for purchase, using an open hierarchical data structure. The invention includes an Application Generator, the Distribution files generated by the Application Generator, and a Retrieval system that accesses the Distribution files. The Retrieval system uses data in the Distribution files to configure an Information System that runs stand-alone on a desktop computer. The information management system of the invention uses an open hierarchical data structure for classifying information objects and providing a menu access to them. The open hierarchical data structure of Zellweger's invention includes multiple pathways to the same information object. Multiple paths can be used to support synonyms and to clarify word meanings within a context, thereby overcoming retrieval problems associated with conventional word-matching technologies. The Distribution files include data related to the menu system and the configuration of the Information System as well as data associated with the information objects. The Retrieval system guides an end-user to information objects in the Distribution files by generating successive selection menus in accordance with the open hierarchical data structure. Also disclosed is an embodiment of the invention that can be used to manage and distribute product information to Buyers in the form of an electronic catalog. Buyers use the custom features of an Information System generated by the Application module to locate products, generate orders for the products, and transmit orders electronically to a vendor of the products.

Zellweger's patent provides suppliers of products with a lot of flexibility when authoring hierarchies to be used by Buyers to find products. However, that same flexibility can cause confusion when applied across suppliers. When a plurality of suppliers could organize product information in a plurality of ways, the resulting structure of a combined hierarchy would not lend itself to efficient finding of products. Furthermore, should different suppliers present their products in a combined hierarchy but in different languages, the Buyer would be truly confused and lost. Therefore, Zellweger's patent cannot be readily applied to the problem of helping Buyers find products offered by a myriad of manufacturers; and, furthermore, Zellweger does not attempt to deal with the problem of presenting menus in various languages to accommodate Buyers around the world.

Consentino et al (U.S. Pat. No. 5,055,515 "Enhanced tree control system for navigating lattices data structures and displaying configurable lattice-node labels," 1991) describe a display and navigation system. That system presents hierarchical data in an enhanced tree presentation control that blends the ease-of-use character of the familiar "tree presentation control" with a technique for navigating more complex lattice data structures. At the same time, the system provides more node information by displaying configured lattice-node labels along with the node's name. A primary objective of the invention is to facilitate building, maintaining and using a multiple inheritance taxonomy such as a product catalog data base by means of a multi-navigation path browsing system, which is made possible through the capability of this system's multiple inheritance capability.

The patent by Consentino et al provides an efficient and clear method of displaying a very limited number of products for selection, too limited a number to efficiently organize and display the thousands of products that would be offered at a Global Store. Furthermore, no provision is made in this patent to accommodate Buyers wanting to use a variety of native languages to find products.

Character Sets and Use of Unicode

Shakib et al (U.S. Pat. No. 5,778,213, "Multilingual Storage and Retrieval," 1998) describe a method for storing and retrieving information in multiple languages and multiple character sets in a computer system. Each language has at least one character set, or code page, that is required to display information. Each character set can include all of the characters used by the respective language (e.g., the letters of the English alphabet or the symbols of Kanji). However, more than one language may use the same character set. Consequently, each language also has language-specific rules for displaying information. The language-specific rules are used for sorting the information.

In some existing computer systems, each processor/storage device only supports a single character set. For example, a server in a Client/server network stores and supports a database. The database is stored in a single character set. A Client requesting information from the database may receive the information only in the single character set. Also, a sort of fields in the database may be created only in the single character set.

In other existing computer systems, all of the information is stored in a universal character set. Using the Client/server example, all information on the network is stored in a universal character set, e.g., Unicode. When a Client requests information, it is converted from Unicode into the Client-selected character set.

Unicode, and other universal character sets, use two bytes to represent each character. Many character sets that support specific languages use only one byte to represent each character.

The method invented by Shakib et al and made available by the Microsoft Corporation has yet to have been adapted and extended for use in a comprehensive global e-commerce system.

Art of Internet Communications for E-commerce Transactions

In general, Web servers are stateless with respect to Client transactions. In other words, at the HTTP protocol level, each transaction (e.g., request for an HTML file) is separate from all others. In other common networking system protocols, a Client might initialize a connection to the server, conduct a series of requests from the server and receive information for each request, and then terminate the connection from the server; and the entire exchange, from the initialization to the termination of the connection, would be considered a session which may comprise a transaction. In such systems, the Client/server connection may be considered to be in one of several different states at any instance, depending on the nature of the requests and responses and their order. Such systems require state information to be saved by the server and also, usually, by the Client. Furthermore, time outs and other connection-failure strategies are required. The stateless nature of the Web simplifies the server and Client architectures.

The Internet has developed into a convenient medium by which consumers can purchase goods and services. The ability to purchase goods over the Internet is sometimes provided by software applications known as a "shopping basket" (or "cart"). A shopping basket application, which commonly executes on a World Wide Web (WWW or Web) site of a product manufacturer or retailer, generally provides a virtual store in which a customer can view descriptions of and purchase various products electronically. A shopping basket application generally allows a customer to add products to or delete products from a virtual shopping basket and specify various attributes, such as quantity, size, color, etc. The customer's selections are generally stored in a database associated with the Website. When the customer is ready to purchase the contents of the shopping basket, he may click on a hypertext link labeled "Purchase Contents of Shopping Basket", for example, which causes the customer to be prompted to enter billing information (i.e., name, address, and credit card number) and to confirm the transaction.

Conventional Art for Use in Global Electronic Commerce

Certain art used in electronic commerce is conventional and well known. Prior art, however, does not encompass a comprehensive global electronic commerce system that combines both innovative art and the following conventional art:

1) Automated Communications: Interfaces for E-Mail notifications,
2) Cookies,
3) Payment Processing,
4) Tax Computing Service,
5) Parcel Tracking,
6) Currency conversion, and
7) Calculation and Display of Shipping Costs

OBJECTS AND ADVANTAGES

The primary object of this invention is to lower the bar for manufacturers to engage in global trade by augmenting or replacing the costly, slow, and inefficient Legacy Channel with a "Virtual Channel" of global trade. Recently invented and improved elements of information technology (both hardware and software) and the Internet provide the building blocks and the opportunity for a revolutionary use of the new Virtual Channel for global trade by even small manufacturers.

Using the multi-language, single, logical database approach described here, an international marketing agent called a "Global Store"—working with e-marketer Referral Websites and integrating other Ancillary Resources—provides a multitude of manufacturers a timely and accurate way to spread their marketing efforts worldwide in the Virtual Channel of global trade.

The present invention makes use of the diversity of locales served by a multitude of Referral Websites serving Buyers around the world. A Buyer at a Referral Website is assumed to be ready and interested in buying a product after that Buyer clicks on the category name of products available for sale. The name of the category is in the same National Language as the language used on the Referral Website. The Global Store is enabled to conduct e-commerce in that particular language as well as the National Languages used at all the other Referral Websites that refer Buyers to the Global Store.

By placing marketing information about products in the Global Store with its multi-language, single, logical, searchable database, a manufacturer can engage in marketing efforts worldwide on the Internet in a multitude of different languages and adapted to various cultures and countries. It has become obvious during the past several years that manufacturers around the world need a global marketing method in order to stay competitive and to optimize their profitability. Use of the Global Store will allow manufacturers advantageously to meet their long felt need to tap into the global market to expand their customer bases, increase sales, and benefit from economies of scale.

Furthermore, use of marketing resources in the Global Store meets the objective for manufacturers to access global marketing efforts without losing control over their marketing—place, presentation, price, promotions, and policies of service. Thereby, manufacturers may build a worldwide brand name based on authentic products, ethical representations, fair prices, and good service to Buyers.

Another object of this invention is to provide manufacturers with a much more efficient and responsive feedback mechanism for adjusting marketing and production schedules. For example, immediate feedback that a new line of skis was selling briskly in South America during May would prompt a ski manufacturer to start adding marketing and production resources for the new line's introduction to Buyers in North America in October.

Another object of the Global Store is to provide better controls over quality of products and services. A complete system of controls spans the Virtual Channel from start (adding a manufacturer's product into a global, multi-version product database) to end (the expiration of an escrow period during which a Buyer may request a refund if a delivered product is not satisfactory).

Another object of the Global Store is to help manufacturers satisfy Buyers' needs for customer service. In order to serve as an alternative to use of the Legacy Channel, the Global Store matches and, where possible, exceeds the level of service that Buyers find in the Legacy Channel. For example, a Buyer in the Legacy Channel may need to call a retail store to inquire about returning a purchased product. In order to find out about return policies and procedures, it is a common experience that the Buyer will 1) need to maneuver through a maze of switchboard options,
2) have a lengthy wait "on hold," and
3) be transferred at least once before (possibly) getting accurate answers from a customer service representative.

In the Global Store, the answers are readily available within the Virtual Channel information system at the same virtual location where the product was purchased.

Another object of this invention is for manufacturers to be able to provide Buyers with adequate information to make buying decisions. Many prospective Buyers will not complete a transaction unless they know not only the cost of the item but also the total price, including shipping fees, etc. The present invention overcomes this barrier by providing a comprehensive, integrated system whereby Buyers from all over the world can get complete information about product, price (stated in the Buyer's currency), and delivery prior to making the buying decision. Furthermore, the use of a single marketing information database allows the manufacturer easily to control and communicate accurate information about product availability in inventory, service availability, warranties, and return policies.

Another object of this invention is to improve the probability a Buyer will complete a purchase transaction after the Buyer has selected a product for purchase. With conventional art, products are placed in a "shopping cart." Unfortunately, that cart often is later abandoned with no purchase made. The invention disclosed here includes an improved shopping cart design, an improvement that facilitates a Buyer's decision to complete a purchase transaction by 1) establishing immediately an interactive relationship with the Buyer by opening a new frame that shows a shopping cart (titled "Open-Frame Interactive Shopping Cart") and asking the Buyer to answer certain questions that appear in the frame before the Buyer proceeds to checkout or returns to shopping,
2) maintaining interactive contact by with the Buyer by keeping a minimized, restorable shopping cart visible on the Buyer's computer screen during the entire time when the Buyer is viewing products after a product has been selected,
3) providing total costs for a purchase, including shipping charges, immediately after the Buyer has selected a product, and
4) prominently offering the option for the Buyer of making an immediate purchase.

An important advantage here is the immediate assumption that the purchase will be made plus the visual reminder that the Buyer has made a selection and that the product is ready for purchase. This approach overcomes the disadvantage of prior art in which the Buyer is implicitly told that the Buyer need only "think about" completing the purchase "later." That implicit message is poor sales technique. It is best to have the Buyer complete the transaction as soon as possible, before the Buyer forgets about the perceived benefits of the product, gets distracted, or hesitates because of second thoughts.

Another object of the invention is to provide Buyers from around the world with an improved way of finding and selecting a desired category of products to view. Conventional art presents the Buyer with (a) a limited selection of categories (e.g., Amazon.com) or (b) an overly large and confusing array of categories (e.g., eBay.com).

The invention disclosed here includes an efficient universal method of organizing and displaying product categories for selection by Buyers. Using sequential drop-down menus and a clearly organized hierarchy, a Buyer quickly and intuitively navigates among thousands of possible categories of products to select a desired category. The process is easily understood, powerful, and efficient.

Furthermore, the above method is a manifestation of a powerful underlying architecture that is independent of locale—a multi-level, hierarchical, logical taxonomy that can be implemented throughout the world. The logical taxonomy provides a framework for locale-specific navigation and categorization that is itself independent of locale and language. The same underlying technology can be used advantageously to construct hierarchical taxonomies that are customized for different locales and languages, allowing categorization of the same products in a way that is available for use by Buyers across various locales. Stated another way, the same technology provides an architectural framework that can be used to construct a multitude of independent locale-specific hierarchical taxonomies. The taxonomies are consistent in design and function for finding products, while still accommodating differences among locales in language and in how products are customarily categorized.

Based on the taxonomy, a hierarchy, conveniently and concisely presented in drop-down menus, allows a Buyer quickly to step down through hierarchical levels with a multitude of nodes at each level. For example, an English-speaking Buyer would sequentially select among nodes listed under (a) Departments, (b) Groups, (c) Families, and, at an end, (d) Categories of products to view. A possible list of sequentially selected nodes might be "Apparel," "Women's Apparel," "Women's Outerwear," and "Women's Jackets." Because unique numeric values are used to identify the nodes of the hierarchy, no dependence on any one language is made in specifying the nodes. The same products might be found by a German-speaking Buyer looking under a Category node with the same numeric value as "Women's Jackets" but labeled "Damenjacken." A Buyer anywhere in the world may use his or her own language to find a category of products to view regardless of the countries of origin of those products.

Another advantage of the disclosed method for organization and display of products is that a product may be assigned to more than one category. This will aid Buyers looking for certain products when the Buyers have different motivations for looking. For example, one Buyer might look under the Category "Survival Equipment" to find "Snowshoes," while another Buyer might look under the Category "Winter Sports Equipment."

Another object of this invention is to increase Buyers' confidence in buying products from foreign manufacturers by providing an escrow system to guarantee delivery and Buyer satisfaction. Thereby, manufacturers will be more likely to sell their products across international boundaries when Buyers feel thus protected.

Another object of the Global Store is to allow manufacturers to provide customized and personalized service to Buyers. Buyers, at the time of ordering, can be given the option to specify attributes for customized manufacturing of some products. (In that case the Buyer is told the number of extra days prior to delivery that will be needed to produce the customized product.) Manufacturers thereby have the advantage of being able to deliver exactly what the Buyer wants without having to keep a large inventory of completed products.

There are social implications to new ways to facilitate global trade. No nation can afford to be left out of the global economy. Use of a public communications system like the Internet to enable global trade inevitably gives access to a nation's citizens to new information and new ideas. Broader implications of the use of the Internet should not be ignored. A benefit of an increase in global trade is that citizens of different nations become exposed to basic humanness in their trading counterparts. They see other citizens of the world as much like themselves and not to be despised or feared. Having access to information that is not controlled by any one government makes citizens less vulnerable to manipulations by despots.

The technology represented here will change the world. Just as tribes have integrated into nations, nations will integrate into global organizations. An analogy to that integration is seen in the evolution of biological organisms. Individual cells became colonies of cells. Those colonies evolved into highly integrated living systems that are well suited to survive in their environment. Just so, mutual interests and instantaneous communications allow nations of the world to evolve new methods of organization to meet global threats to peace and the environment.

Though the invention disclosed here focuses upon trade of physical products, it also, inevitably, facilitates movement of information and ideas because digitalized products are included. What will it mean when citizens of the world have easy access to information and ideas across barriers of nations, cultures, and languages? With respect to the invention disclosed here, it can be seen that a powerful, language-neutral taxonomic system is part of the Global Store. That system lends itself finding not only tangible products but also digitalized information (books, software, tapes, films, etc.). For example, it would be possible to adapt the taxonomic system to make available online the about 100,000, 000 items in the Library of Congress, representing approximately 500 languages. And each item could be found by using no more than six or seven mouse clicks.

Other aspects, advantages, and novel features of the invention will become apparent upon reading the following detailed description and upon referring to accompanying drawings.

BRIEF SUMMARY OF THE INVENTION

The present invention is a method and apparatus for overcoming barriers of nation, culture, and language between manufacturers and Buyers. Using their computers to visit selected Websites on the Internet, Buyers are able to access a common multi-language database of marketing information about a manufacturer's product. The marketing information about the product occurs in a multitude of versions adapted to Buyers in various local markets, depending on nation, culture and language.

Buyers in a local market are offered the opportunity to view products for purchase, said offer made at a Referral Website that serves their particular locale. Having selected a category of products for viewing, a Buyer then sees a version of marketing information about each product, said version adapted for the language, culture, and nationality as indicated from the Buyer's use of the Referral Website.

The Buyer, using his or her preferred language, then orders the product, tracks delivery, and has access to customer service.

An innovative system of controls guarantees a high quality of product and a high level of service for the Buyer. The controller apparatus of the invention allows proactive control over (a) selection of manufacturers who provide products, (b) selection products to go into the common database, (c) selection of Websites from which Buyers are referred, and (d) quality of service standards, including the availability of products in inventory for immediate shipment.

DETAILED DESCRIPTION OF THE INVENTION

Figure 1:
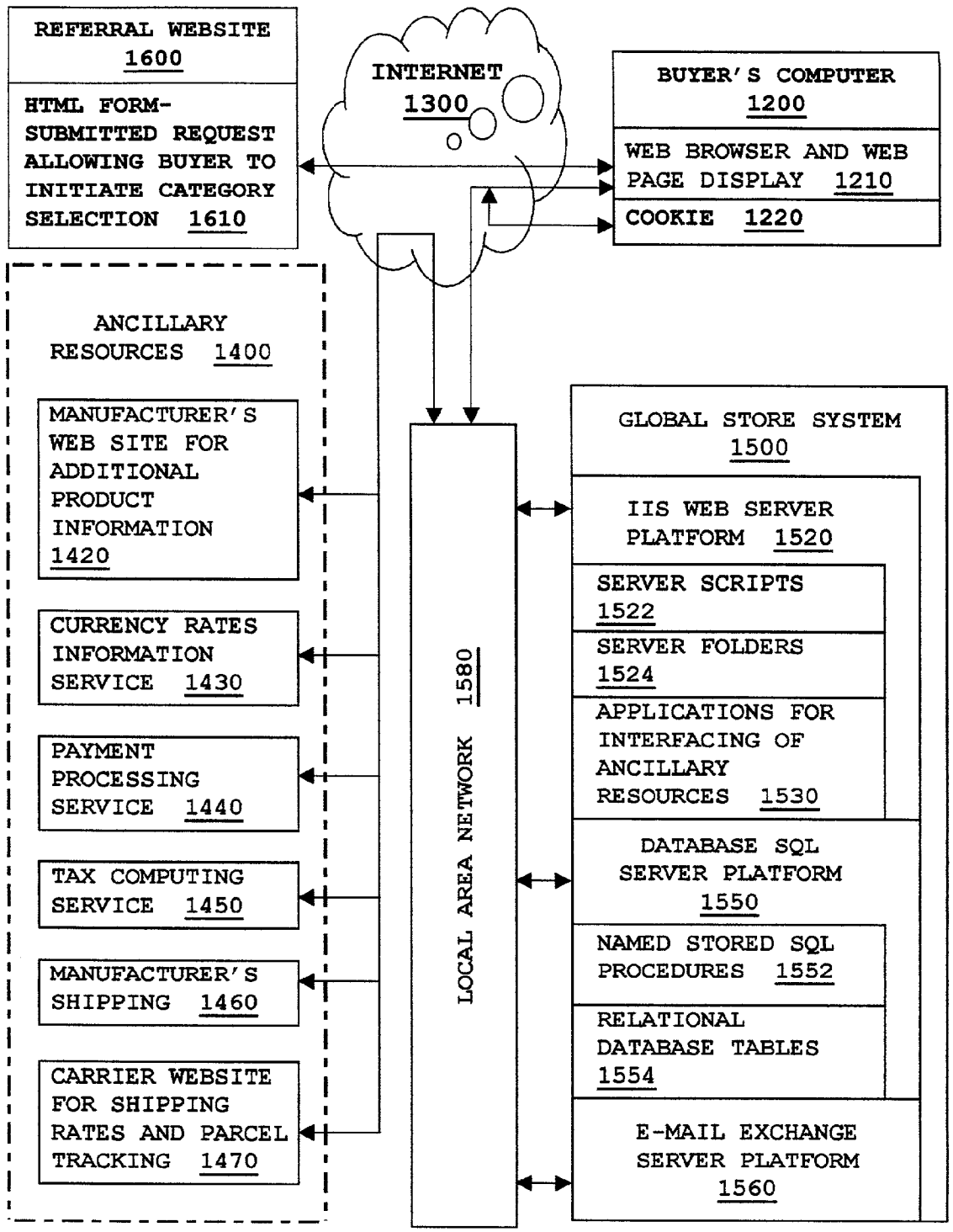
FIG. 1 is a high-level block diagram of the Virtual Channel of global trade, illustrating the hardware and software used by Buyers, Referral Websites, the Global Store, and Ancillary Resources.

While the preferred embodiment of this invention is shown and described here, the invention is not thereby limited to the specific embodiment disclosed. The following description is merely illustrative, having been presented by way of example only. Numerous rearrangements, modifications, and substitutions may be made within the spirit or scope of this invention by one skilled in the arts to which this invention pertains. These and other embodiments are considered to be within the scope and spirit of the present invention. For example, the invention is not limited to use on the Internet or using the Web or private web such as an internal corporate web or using the HTTP communication protocol. Other protocols and usage variations, using messages communicated over TCP/IP connections, are also possible. Another example is the use of scripts other than those specified, e.g. Javascript. Markup languages other than HTML may be used, or a mixture of markup languages may be used. The client and server may be connected by the Internet or a private intranet. Other server platforms, operating systems, gateways, SQL servers, locale definitions, and locale-specific character-sets (rather than UTF-8) may be substituted. The method of client-server interoperability interface may be rearranged and reconfigured and still be within the teachings of the patent. For example, the menu navigation/product selection/shopping cart panel can be implemented with a Java plug-in. For scalability, in other embodiments, additional servers may be used and routers added. Functions may be combined on one server or dispersed onto multiple servers. The scope of the present invention is defined by the claims that are appended.

Glossary: Vocabulary of the Virtual Channel

Technical descriptions and specifications are written at a level that assumes the reader has skill in arts of Web Servers, Browser/Client, SQL Database Servers, e-commerce, and internationalized Internet protocols and markup language standards. The following glossary describes how selected technical terms are used in this document. It is included here to make following sections easier to understand for a non-expert.

Active Server Pages (ASP) script technology facilitates simplified creation of interactive Web pages in this invention that allow a Buyer to make selections from Web pages sent for the Buyers inspection and use. A dynamically created Web page with an ASP extension utilizes ActiveX scripting. When a Browser requests an ASP page, the Web server generates a page with HTML code and sends it back to the Browser.

ActiveX Server Component is an ActiveX Component designed to run on the server-side of a Client/server application.

ActiveX (RTM) Data Objects (ADO) are a collection of data access objects within a hierarchical object library. ADO enables Client application access to data in SQL 2000 server from Internet Information Server 5.0 and ASP. The Microsoft Web-based object technology enables intelligent objects to be embedded in Web documents to create interactive pages, thus facilitating the Buyers access to information stored in the central marketing database.

ActiveX Scripting is using a scripting language to drive ActiveX Components. ActiveX Scripting is made possible by plugging a scripting engine into a host application. A scripting engine enables the processing of a specific scripting language such as VBScript, as included in IIS with Active Server Pages.

ADO Active Data Objects are a set of object-based, data-access interfaces within ASP for optimized Internet-based, data-centric applications.

Ancillary Resource Websites are Websites accessible via the Internet suite of protocols that provide specific informational or processing services, generally on a subscription basis. Examples include (a) credit card and general payment processing, (b) currency conversion quotations, and (c) tax computing services. Each of these requires an Application Programming Interface (API) software to match the host application to the external service via the TCP/IP protocol.

Architectural Design specifies framework and components that provide independence of database schema and database information from applications and queries used to select information. This independence allows for flexibility in (a) adding to or maintaining the database and (b) accessing and displaying information from the database.

ASCII American Standard Code for Information Interchange is a standard definition for character sets, using 7-bits.

Bind refers to putting an object into its running state, allowing the operations it supports to be invoked. Objects can be bound at run time—called late binding or dynamic binding. Binding at compile time is called static binding. Binding is the process that enables dynamic Web page generation by IIS at run-time. Binding is also performed at development time on a development system to produce the locale-specific ASP scripts stored and used in the server.

Cache is temporary, local storing of Web pages, precluding need of the server to regenerate them.

Call is to transfer program execution to some other section of code, usually a subroutine, while saving the necessary information to allow execution to resume at the calling point when the called section has completed execution.

Category Name Table is an alphabetical list of all product categories in Unicode for National English and other national languages plus a unique numerical value, the CatID associated with each product category name. The same CatID is associated with the same set of products, independent of the national language used to name the category. This table also includes LCID values as an index associated with category names as expressed in the respective national languages.

CatID is the unique numerical value assigned to each category. Use of this table and the numerical value of the categories allows ease of translation and access of data across different locales.

Category System allows products to be described and found by category. This is part of a four-tier system going in declining inclusiveness from department, to group, to family, to category, to product. (See Taxonomy)

CGI Common Gateway Interface is a server-side interface for initiating software services. CGI allows scripts and executable programs to access the user requests and server responses in order to create dynamic pages with ASP (Active Server Pages).

Character is the smallest component of written language that has semantic value. A character has a single abstract meaning and/or shape, but not a specific shape.

Character Set is a collection of characters, numbers, punctuation, symbols, and special characters for a particular national language. Using a process called encoding, each character in a national language (plus each special character used) is assigned a numeric value called a code point.

Character Encoding Scheme (CES) enables transmission or storage using byte-oriented devices.

Charset is a method of mapping a sequence of (8-bit) octets to a sequence of abstract characters. A Charset is, in effect, a combination of one or more CCS with a CES. Charset is used in HTML and HTTP specifying UTF-8, in the invention. Document Charset, or encoding, is defined by IANA (Internet Assigned Numbers Authority). IANA is dedicated to preserving the central coordinating functions of the global Internet for the public good. Charset names, e.g. UTF-8, are defined and registered by the IANA according to procedures documented in RFC 2278. The Charset is used in the HEAD portion of the HTML document and tells the Browser how the text in the document has been encoded.

Client Browser is a program running on a Client's PC operating system that interprets HTML and displays text and graphic information on a computer screen for viewing. A person uses a Browser to view the contents of network Websites and to navigate among them. Popular examples include Microsoft Internet Explorer (RTM) and Netscape Navigator (RTM). Newer versions can browse HTML with multiple frames.

Client-Server. A model of interaction in a distributed system in which a program at one site sends a request to a program at another site and waits for a response. The requesting program is called the "Client," and the program that responds to the request is called the "server." In the context of the WWW, the Client is a "Web Browser" (or simply "Browser") that runs on a computer of a user; the program which responds to Browser requests by serving Web pages is commonly referred to as a "Web server." The Browser-Client portion of the application is optimized for user interaction, whereas the server portion provides the centralized, multi-user functionality.

Code Page is a coded character set, often referring to an ANSI coded character set used by a personal computer.

Code Point is (a) A numerical index (or position) in an encoding table used for encoding characters or (b) Synonym for Unicode scalar value.

Coded Character Set (CCS) means that each character in a repertoire is associated with a non-negative integer, the code point (also known as a character number). The coded character set (CCS) is the result of a mapping from the repertoire to the set of non-negative integers.

Communications Protocol is a set of rules or standards designed to enable computers to connect with one another and to exchange information with as few errors as possible. Internet Protocols are engineered and developed by the Internet Society (ISOC).

Control is an object on the display screen that can be manipulated by a user to perform an action. The most common controls are buttons that a user can click to select an option and scroll bars that a user employs to move through a document or position text in a window.

Cookie is a small file created on a Client's computer to indicate prior registration of the Client (Buyer) and the Referral Website. The cookie is used to track repeat visits defining a buyer's session.

CSS Cascading Style Sheet is a simple mechanism for adding style to Web documents, e.g. fonts, colors, spacing, and text direction. Text direction can be LTR (Left to Right) or RTL (Right to Left). HTML 4.01 provides a LINK tag that enables CSS to be stored on the server to be downloaded by the Browser during rendering of the Web page. CSS is stored in locale-specific folders on the Web server. Web pages are generated using server scripts that use common CSS for the locale. Streaming Fonts are facilitated by CSS to overcome any "missing font" conditions in the Browser. (See Fonts—Streaming)

Cursor enables forward and backward navigation in a recordset returned from the SQL Server. A cursor also enables column-by-column navigation of a record selected.

Cursor Engine is a mechanism in IIS for managing data retrieved from a database and for updating of server-based data.

Currency Ratio Table contains the ratio of the various locales' currency for use in translating amounts from one currency to another. Daily updates for currency conversion ratios is obtained and stored. Conversion ratios are then applied daily in a maintenance cycle to all prices in the product price fields in each version. The manufacturer's locale currency is used as the base currency used to calculate prices in other product record versions.

Database Management System (DBMS) is a software application used to build a database and to operate on data within the database. The DBMS stores, retrieves, and modifies data associated with the database. Lastly, to the extent possible, the DBMS protects data from corruption and unauthorized access.

Database Table is a collection of information in a relational database that is organized into fields and rows. Individual rows (records) are selected using an SQL Statement invoked from a Stored Procedure.

Date/Time Stamp is a text string used to format a date and time, for example, "MMMM dddd yyyy". A locale-invariant format is used in all locales as a date/time stamp in data base tables.

Department is the topmost level of product categorization in the Global Store product Taxonomy. (See Taxonomy.)

Design-Time Control (DTC) is an ActiveX control designed to generate runtime text and insert it into a document while the document is being edited. The control is "live" only at design-time when the document is open in the editor.

DLL (Dynamic Link Library) (RTM) is a feature of the Microsoft Windows (RTM) family of operating systems that (a) supports executable routines—usually serving a specific function or set of functions—to be stored separately as files with the extension .dll and (b) load only when called by the program that needs them. This saves memory during program execution and enables code reusability.

Domain Name is a name that identifies one or more IP addresses. For example, the domain name microsoft.com represents about a dozen IP addresses. Domain names are used in URLs to identify particular Web pages.

Dynamic WebPages. (See Active Server Pages.)

Event-driven status monitoring is used by Client-Side JScript procedure, for example, to initiate an action upon the event of a user. Typical events include pressing a keyboard key, choosing a button using a mouse click, and other mouse actions.

External Gateway is a link to access information for functions such as parcel tracking. A Website where parcel tracking is available for use by the Global Store would be considered an Ancillary Resource.

Font is a collection of glyphs used for the visual depiction of character data. A font is normally associated with a set of parameters (for example, size, posture, weight, and serifness), which, when set to particular values, generate a collection of imagable glyphs. The fonts are stored on the Browser's computer. (See Streaming Fonts.)

Form is an HTML element that allows users to fill in, or select from a menu, information and submit it to a server for processing.

Form Processing with ASP pages occurs when ASP server script files are the targets of Client HTML form requests submitted from an HTML Web page in a Browser. An HTML FORM tag is used The FORM request is for a dynamically generated HTML response that, in turn, may contain yet another similar HTTP request. These requests include Tokens sent with the submission to convey to the server script parameters to get the proper response, such as a product category.

Frame is a rectangular subspace within a Frameset document. Each FRAME must be contained within a FRAMESET that defines the dimensions of the frame. If HTML sent to the Browser by a server-script does not include <FRAMESET> and <FRAME> tags, the display uses a single frame occupying the entire screen.

Frameset defines the dimensions of the frames and their names.

Fulfillment is a function whereby a purchased product is delivered to a Buyer from a Manufacturer's Fulfillment Center. A Manufacturer may choose to employ multiple Fulfillment Center's in different locales. A Fulfillment Center is designated for each locale.

Fulfillment Center receives product orders from the Global Store through Email messaging using UTF-8 Unicode Transformation. The Global Store issues the Fulfillment Order to the Fulfillment Center and the Fulfillment Center sends back the Carrier's Tracking number.

GIF Graphics Interchange Format is a computer graphics file format for use in photo-quality graphic image display on computer screens.

Global.asa is a file which specifies event procedures and declares objects that have session or application scope. It is not a content file displayed to the users; it stores event information and objects used globally by the application. This file must be named Global.asa and must be stored in the root directory of the application. An application can have only one Global.asa file.

Global Store Marketing Database is a language-neutral database for storing and sharing multi-version marketing, sales, and customer service information across frontiers of countries, cultures, and languages.

Global Store is the part of the Virtual Channel that controls information flow between Buyers and the database and between Ancillary Resources and the database and Buyers.

Global System is a Client-server application for global trade that uses Unicode and achieves integration of operating subsystems while allowing locale-specific communications.

Globalization "G11N" describes the business management process and infrastructure necessary to support the development, marketing, and distribution of a company's goods and services worldwide. Globalization seeks to achieve the goal of maximum resource utilization and return on investment.

Glyph is an abstract form that represents one or more glyph images. In displaying Unicode character data, one or more glyphs may be selected to depict a particular character. These glyphs are selected by a Browser's rendering engine during composition and layout processing. The actual shape (bit pattern, outline, and so forth) of a character image is a glyph. For example, an italic "a" and a roman "a" are two different glyphs representing the same underlying character. A glyph is one specific shape that a character can have when it is rendered or displayed. A single glyph may correspond to a single character, or it may correspond to many characters; for example, the same glyph is used to represent the Latin capital letter "P" and the Greek capital letter "Rho."

Hidden Fields are embedded in a form in a Web page sent to a Web Browser. The field does not appear in the Browser. The Hidden Field can be used to identify the particular session or transaction identity.

Host is any computer that provides services to remote computers or users.

Hot Link is a connection to a document, image, or other file on the Internet that generally appears as a highlighted word or image on a computer screen (also Hypertext Link or Link). The hot link, when clicked by a mouse pointer, causes a request to be issued via HTTP for a Web page to be sent from the embedded server URL. The Web page is then sent to the Client using HTTP.

Hot Spot is an image that, when clicked, initiates a Hypertext Link.

HTML (HyperText Markup Language) is a text description language; it mixes text format markup with plain text content to describe formatted text. HTML is ubiquitous as the source language for Web pages on the Internet. Starting with HTML 4.0, the Unicode Standard functions as the reference character set for HTML content.

HTTP (HyperText Transport Protocol) is a standard World Wide Web Client-server protocol used for the exchange of information (such as HTML documents, and Client requests for such documents) between a Browser and a Web server over the Internet using the TCP/IP suite of protocols. HTTP is a member of the TCP/IP suite of protocols because it uses TCP/IP for its transport and IP for routing. HTTP includes a number of different types of messages that can be sent from the Client to the server to request different types of server actions.

HTTPS is a secure version of HTTP protocol, approved by the IETF, using digital certificates that can uniquely identify the server and Client, and encrypt all communication between them. This extension to the HTTP protocol supports sending data securely over the World Wide Web.

Hyperlink is a navigational link from one document to another or from one portion (or component) of a document to another. Typically, a hyperlink is displayed as a highlighted word or phrase that can be selected by clicking on it using a mouse to jump to the associated document or documented portion.

IAB (Internet Architecture Board) is the body that helps define the overall architecture and design of Internet protocols. The IAB is the technical advisory group of the ISOC.

Include Script directive provides a way to insert the content of an "Include" ASP file into an ASP file before ASP.dll processes it.

Internationalization of a site means that will be viewed in countries other than the United States, you can use the CODEPAGE tag within the ASP's <% %> delimiters to specify the proper code page.

IETF or Internet Engineering Task Force is a protocol engineering and development organization focused on the Internet. The IETF is a large, open international community of network designers, operators, vendors, and researchers concerned with the evolution of the Internet architecture and the smooth operation of the Internet. It is now under the auspices of the ISOC.

Internet (Abbreviation for Internetwork) is a set of dissimilar computer networks joined together by means of gateways that handle data transfer and the conversion of messages from the sending network to the protocols used by the receiving networks. These networks and gateways use the TCP/IP suite of protocols.

IIS (Internet Information Server) supports applications that use CGI, ASP, IDC and ISAPI; and interfaces with Windows (RTM) NT/2000 and other services running on the server machine.

International Standards Organization (ISO) sets standards for key technologies like networking and universal methods of language encoding.

Internationalization, "I18N," is the process of engineering locale-neutral systems. The core functionality of internationalized software is designed to operate independently of language and locale-specific conditions.

Internet Mail is defined by IETF RFC 822 "STANDARD FOR THE FORMAT OF ARPA INTERNET TEXT MESSAGES". This standard was defined for encoding 7 bit, 128 character ASCII, later updated by MIME specifications for 8 bit characters and to Internationalize Internet Mail.

Internet Mail Standards Internet mail is defined by a large number of standards and recommendations that are codified by the Internet Engineering Task Force (IETF).

ISAPI (Internet Server Application Programming Interface) is a broadly standardized interface that allows server-side programs to create dynamic Web pages, in a similar way to CGI.

ISOC (Internet SOCiety) is a professional membership society with more than 150 organizational and 6,000 individual members in over 100 countries. It is a non-governmental, non-profit organization dedicated to maintaining and enhancing the Internet. Through its committees, such as the Internet Advisory Board (IAB) and the Internet Engineering Task Force (IETF), the Internet Society is responsible for developing and approving new Internet standards and protocols including HTML, HTTP, MIME, FTP, and TCP/IP.

ISO 10646 is the International Standards Organization's encoding that is code-for-code equivalent to Unicode.

Join is a database operation in which related rows from two or more tables are combined to form a single result table. Use of joins between tables allows data to be stored in a way that minimizes duplication.

JScript is the Microsoft (RTM) open implementation of JavaScript. JScript is fully compatible with JavaScript in Netscape Navigator (RTM). JScript is included in the HTML Web pages dynamically produced by the ASP server scripts. The Web Browser includes a JScript engine for processing. HTML 4.01 is designed to interoperate with JScript. For example, when clicking on an HTML Menu selection, a JScript procedure can monitor the event of that mouse pointer click and implement the Form's submission Request using its Post method.

Key Field is a field in a relational table used to support indexing and in relational joins with other tables in an SQL statement.

Key Index in a table allows fast sorting and selecting of records in the table.

LCID (see Locale ID)

Locale has a greater meaning than Language Code, but Language Code is used to identify a Locale. The language code definition for each locale is specified by RFC 1766—language codes which in turn references ISO-639 (language codes) and ISO-3166 (country codes). For example, French-Canadian becomes "fr-ca" string. All locale strings contained in ISO-639, HTML, and HTTP 1.1 are in US-ASCII.

Localization, L10N, is a generic term indicating a set of attributes related to language and other national/cultural preferences and the process of customizing all user elements of an application to conform to the requirements of a given locale. Examples include currency formats, date and time format, calendar type, number formats, sentence word order, directionality, and punctuation. Localization may include translation of locale-dependent text, graphics, and data.

Locale ID (LCID) is a 32-bit numeric value in hexadecimal that identifies a locale. Locale values are specified by constants programmed within the Microsoft (RTM) server. The LCID value associated with a Referral Website serves to identify the locale-specific country/language pair.

Manufacturer's Product Identifier is the Manufacturer's identifier used in a product record.

Meta Character is the charset tag used to designate to the Browser the character set of the Web page through its use in the META statement contained in the Header of the Web page. For UTF-8 (Universal) one would see, for example:
<META HTTP-EQUIV="Content-Type" content="text/html; charset=UTF-8">

MIME (Multipurpose Internet Mail Extensions) is an extension of the Standard Internet mail protocol that enables sending 8-bit based e-mail messages, which are used to support extended character sets, voice mail, facsimile images, and so forth. MIME is a standard that allows the embedding of arbitrary documents and other binary data of known types (images, sound, video, and so on) into e-mail handled by ordinary Internet electronic mail interchange protocols. (RFC's 2045-2049 define the MIME standards.)

Multilingualism in HTML involves creating and maintaining versions in multiple languages.

Named Stored Procedure is a name given to a Stored Procedure for identification purposes. (See Stored Procedure.)

National language is the language ubiquitous to a locale.

Object Oriented Programming (OOP) provides a way for digital information to be packaged in a manner that enables re-use of software code and, thereby, simplifying programming.

Open Database Connectivity (ODBC) is Microsoft's interface that translates vendor-specific relational database to a common SQL standard to allow processing using Windows (RTM) applications.

Open-Frame Interactive Shopping Cart (OFISC) is the function performed the Global Store after a product is selected for purchase by a Buyer. A new frame opens in the bottom of the window to display information about which products have been selected for purchase. The frame remains viewable throughout the time the Buyer continues to view products and prior to the time that the purchase is completed or the Buyer leaves the product viewing process.

Parser comes from "parts of speech" in Latin. It means to part or break down into component parts. An ASP parser, ASP.dll, is a specialized software program that recognizes the different parts of the ASP script and processes the parts.

POST method message in an HTML Form, when triggered, submits an HTTP request to the server to return a requested document or file.

Products Category Display Panel is the Web page that is sent to the Buyer for viewing after the Buyer has selected a category of products for viewing. Only those products are available to the display panel in the page that are available for sale in the Buyers locale (as determined from the locale's LCID). Panels have drop-down menus and a product description result sets. This Web page is sent to Buyers for their interactive selection of a category of products to view.

Product Category is a subset of products in a taxonomic grouping of products. All the product categories are organized within a smaller number of Product Families.

Product Category Display is a display of products in a Frame where the products can be individually selected without losing the display.

Product Department is a subset of products in a taxonomic grouping of products. This is the most general level of a taxonomic structure for organizing products that contains Departments, Groups, Families, and Categories.

Product Family is a subset of products in a taxonomic grouping of products. All the Product Families are organized within a smaller number of Product Groups.

Product Group is a subset of products in a taxonomic grouping of products. All the product groups are organized within a smaller number of Product Departments.

Product Version is provided for each locale and identified by a different LCID. Each Product Version has a separate record containing the products description appropriate to the locale's customs and National Language. Each unique product is identified by a ProdID identifier and is ordered from Manufacturer's Fulfillment Center.

Query is an operation on a database table to select and process information that is then reported back in a result set. Use of queries that are triggered by Buyers' selections result in the appropriate information being sent to the Buyer's Web Browser to be displayed as a Web page.

Recordset is a set of records returned for processing from an ADO Call in to a Stored Procedure on an SQL Server.

ReferID is a unique identifier assigned to a Referral Website. That identifier is transmitted to the Global Store via a URL string when the Buyer initiates a request to view products. It is contained in the cookie that is stored in the Buyer's computer.

Referral is the function performed at a Referral Website when a Buyer selects a department of products to view. That selection causes an http request for information to be sent to the Global Store, thus establishing communication between the Buyer and the Global Store.

Relational Database is a type of database where information is organized into tables.

Rendering is (a) a Browser's process of selecting and laying out glyphs for depicting characters or (b) the process of making glyphs visible on a display device.

Repertoire is a specified set of characters that are each represented by one or more bit combinations of a coded character set.

Result Set is the records returned when a stored SQL query is invoked.

RFC (Request For Comment) is the primary mechanism used by the IETF to publish authoritative documents, including Internet standards including TCP/IP, HTML, HTTP, MIME and others.

Schema is a collection of tables in a database used to organize and manage the information.

Script is a kind of program that consists of a set of instructions for an application or utility program. Scripts are included in the Web pages sent to a Buyer, thus increasing the usefulness of the page in displaying information and allowing interactivity.

Server Side ASP Scripting is used to enclose, within the ASP script (server-side <SCRIPT> tag), that script that is to be run on the server-side. The server-side script is braced with the lead statement: <SCRIPT RUNAT="Server" Language=VBScript"> and the end of server-side script is </SCRIPT>. The script type can include other script type allowed by ASP.

Session is an interaction between a Client and a server that transcends multiple scripts.

Session.LCID is a parameter set at the beginning of any ASP script segment including a write statement for (a) currency, (b) date, (c) time, and (d) number formats. The LCID value is specified in the URL string from the request initiated from the Buyer's Browser. After the Session.LCID is set, the written statements will be formatted correctly for the Buyer's locale.

Settlement is the function of providing payment to a manufacturer after a purchased product has been satisfactorily delivered to a Buyer.

SQL (see Structured Query Language)

SQL Stored Procedures are pre-compiled software functions that are managed and run within a remote database management system (RDBMS). Stored procedures provide reusable services that can be shared by multiple applications and users. They typically capture business processes and data manipulation functions that are part of the server-side of a Client/server application. Stored procedures are written in SQL.

Status Code is a language neutral way to track changes in status by an event monitoring system.

Status Code Table is a table that contains status codes.

Stored Procedures Pre-compiled software functions are managed and run within a remote database management system (RDBMS). Stored procedures provide a reusable service that can be shared by multiple applications and users. They typically capture business processes and data manipulation functions that are part of the server-side of a Client/server application. Stored procedures are written in SQL. The stored procedure is assigned a name that can be referenced by a calling ASP script.

Streaming Fonts are used, in conjunction with CSS (Cascading Style Sheets), to overcome "missing font" conditions where local fonts are inadequate to properly render the Web page.

Strip is an HTML Product Description containing an embedded Form that submits a Product identifier to a server for processing when checked.

Structured Query Language (SQL) is the international standard language for defining and accessing relational databases. Implementations may have slight variations.

Taxonomy is comprised of four levels, and top to bottom: Department, Group, Family, and Category. The Taxonomy is independent of locale and thereby facilitates product database integration across locales. Products are found through a drill-down process, navigating unique paths through the structure and in four decisions arrive at a selected category of products assigned ready for display in the language version of the locale.

TCP/IP (Transmission Control Protocol/Internet Protocol) is a combined set of communications protocols that are used to connect hosts and perform the transfer of data between them. TCP monitors and ensures correct transfer of data. IP receives the data from TCP, breaks it up into packets, and sends it to a network within the Internet. TCP/IP supports higher level communications protocols such as HTTP, FTP, and FTP.

Text String is a sequence of letter, number, and other characters that is digitally encoded and can be decoded by an appropriate software application. Text strings are stored in table record's fields.

Tracking Number is the numbered assigned to a purchase item that is used to allow access to information about where the product is in the delivery process.

Transaction is a set of two or more database updates that must be completed in an all-or-nothing fashion.

Trigger is an event that is scheduled to occur upon the change in a certain parameter in a database table.

UCS (Universal Character Set) is specified by International Standard ISO/IEC 10646.

Unicode is a fixed-width, 16-bit worldwide character character-encoding standard. This standard was developed and is maintained and promoted by the Unicode Consortium, a nonprofit computer industry organization. Windows 2000 (RTM) uses it as the default at the system level for character and string manipulation. Unicode simplifies localization of software and improves multilingual text processing. Unicode defines semantics for each character, standardizes script behavior, provides a standard algorithm for bi-directional text, and defines cross-mappings to other encoding standards. Unicode is compatible with ASCII characters. The first 128 Unicode characters correspond to the ASCII characters and have the same numeric value. ASCII's 0x41 is the same as Unicode's \u0041. While ASCII's 128 characters support just the Latin alphabet, Unicode's over 65,000 characters can support many different languages. Unicode is fully compatible with ISO's 10646-1 and UCS-2 standards. JavaScript programs will still be written in the ASCII-set characters. You can use non-ASCII Unicode characters in the comments and string literals of JavaScript/JScript.

Unicode Bidirectional (Bidi) Algorithm is the Unicode standard that defines a complex algorithm for determining the proper directionality of text. The algorithm consists of an implicit part based on character properties as well as explicit controls for embeddings and overrides.

Unicode in the Global Store Information in the Global Marketing Database is stored in Unicode, thus accommodating all national languages. Unicode use is maintained exclusively until the prepared Web page is ready to send to the Buyer's Browser. At that point the character set is converted to the character set specific to the locale of the Buyer.

Unicode Normalization is a process to transcode source text from a legacy code to Unicode that is normalized. (for details see Character Model for the World Wide Web 1.0, W3C Working Draft 26 Jan. 2001)

Unicode Standard, version 1.1 [UNICODE], and ISO/IEC 10646-1:1993 [ISO-10646] jointly define a 16 bit character set, UCS-2, which encompasses most of the world's writing systems, reference RFC 2044.

Universal Character Set (UCS) ISO/IEC 10646-1 defines a multi-octet character set that encompasses most of the world's writing systems. (See Unicode)

URL (Uniform Resource Locator) is a unique address that fully specifies the location of a file or other resource on the Internet.

UTF-8 UCS Transformation Format (RFC 2279, "UTF-8, a transformation format of ISO 10646") is an 8-bit character encoding scheme. UTF-8 uses all bits of an octet, but has the quality of preserving the full US-ASCII range: US-ASCII characters are encoded in one octet having the normal US-ASCII value, and any octet with such a value can only stand for an US-ASCII character, and nothing else. UTF-8 serializes a Unicode (UCS-2) scalar value as a sequence of one to six bytes, depending on the value of the character.

VBScript is a scripting language developed by Microsoft and is based on Visual Basic programming language. VBScript is supported by ASP, which invokes a VBScript engine to process VBScript procedures. A VBScript procedure is used to invoke ADO parameterized Calls to the SQL Server to obtain locale-specific product Record Sets. VBScript procedures convert UCS-2 information obtained from the server into written HTML, including MIME, using UTF-8 encoding.

W3C World Wide Web Consortium was founded in 1994 to develop common standards for the World Wide Web. The W3C is an international industry consortium. W3C (http://www.w3.org) develops interoperable technologies (specifications, guidelines, software, and tools) to lead the Web to its full potential. A key effort is to embrace Unicode and extend existing standards to include UTF-8. Unicode now serves as a common reference for W3C specifications and applications.

Web Application is a software program that uses HTTP for its core communication protocol and delivers Web-based information to the user in the HTML language.

Web Browser is the Client in the Client/server network.

Web Server is a computer on the Web that shares HTML-tagged text and graphics files with Clients.

Website is a computer system that serves informational content over a network using the standard protocols of the World Wide Web. Typically, a Website corresponds to a particular Internet domain name, such as "microsoft.com," and includes the content associated with a particular organization. As used herein, the term is generally intended to encompass both (a) the hardware/software server components that serve the informational content over the network, and (b) the "back end" hardware/software components, including any non-standard or specialized components, that interact with the server components to perform services for Website users.

Windows 2000, Server Edition (RTM), is the server upgraded from Windows NT 4.0 (RTM). This system runs the Internet Information Server and hosts the SQL 2000 server for the SQL relational database tables and associated stored SQL procedures.

World Wide Web (Web or WWW) is a set of services that run on top of the Internet, providing a cost-effective way of publishing information, supporting collaboration and workflow, and delivering business applications to any connected user in the world. The Web is a collection of Internet host systems that make these services available on the Internet using the HTTP protocol.

Writing Direction is the direction or orientation of writing characters within lines of text in a writing system. Three directions are common in modern writing systems: left to right, right to left, and top to bottom.

Writing System is a set of rules for using one or more scripts to write a particular language. Examples include the American English writing system, the British English writing system, the French writing system, and the Japanese writing system. XML (extensible Markup Language) is a simplified subset of the Standard Generalized Markup Language (SGML, ISO 8879) that provides for interchange of a file format for representing data, a schema for describing data structure, and a mechanism for extending and annotating HTML with semantic information.

Overview of the Global Store System within the Virtual Channel

The diagram seen in FIG. 1 provides an overview of components of a Virtual Channel of global trade—including the Global Store System 1500, which knits together components of the Channel. This section describes technical characteristics of the system and its relationships with other components of the Virtual Channel. In the description of FIG. 1 that follows, as well as in following sections, indented Technical Notes are interspersed that provide details sufficient to enable one skilled in the art, without undue experimentation, to construct and implement a Global Store system.

HTTP-requests and other communications over the Internet between the Buyer and the Global Store are routed via a Local Area Network 1580 and an Internet Information Server—the IIS Web Server Platform 1520. The Global Store also connects to various Ancillary Resources 1400 that enable the Global Store to provide information and services that support marketing, sales, and delivery processes. The connections to these Ancillary Resources are supported by Interfacing Applications for Use of Ancillary Resources 1530. Software technology used to access those supportive resources over the Internet are provided by the purveyor of those services. That technology is well understood, widely available, and needs little exposition for the purposes of the present application.

Internationalization and localization are key concepts in the embodiment of the Global Store system—a system that responds to Buyers around the world in locale-specific ways from one integrated system that accesses information from a single, multi-version database. The technical description of how that is done, using system locale-identifier numeric values (LCIDs), is explained in detail below by documenting the use of LCIDs with ASP server scripts, stored SQL procedures, and externally-linked Cascaded Style Sheets (CSSs). Server Folders (1524) store locale-specific ASP Server Scripts and linked CSSs.

To accommodate the storage, retrieval, and display of information across a multitude of National Languages, certain sophisticated technologies are employed to create an integrated processing environment. Active Server Pages (ASPs) are used selectively to produce cultural, locale, and linguistic differences in Web pages. Those pages are constructed by automatically using National Language designator names to select correct text fragments and graphics from a plurality of such items in a table. Selection of proper text and graphics is enabled by use of LCIDs to differentiate database and server-script versions.

Different versions of records containing product information appear in the Database SQL Server Platform 1550. Different versions accommodate differences in Buyer's languages/locales. Appropriate selective access to those records is enabled by the using locale-identifier values of LCID to identify the various versions. LCID is a key field in records of product information, and the values in that field vary from version to version.

Similarly, LCID values serve to differentiate the various Server Scripts 1522 that generate content for Buyers in different locales. Those scripts are essentially identical in generating Web pages, but they differ as to using (a) different locale-specific versions of product records and (b) content that is invariant as to meaning from page to page but where the expression of that content varies from locale to locale (e.g., labels for navigation, fonts, etc.). The mechanism whereby scripts are accessed is aided by storing the Server Scripts 1522 on the IIS Web Server Platform 1520 in Server Folders 1524 that are named with the values of the various locales that are served. Thus, the server folder named "1031" contains a script named Disp.asp that is used to display product information from the database where (a) the LCID field of pertinent records has a value of "1031," and (b) HTML script is properly configured for labels, fonts, etc. for a Buyer in locale 1031. By contrast, the server folder named "222" contains a script named Disp.asp (same name), but the records accessed and the labels, fonts, etc. used are specific to locale "222." Similarly, Cascaded Style Sheets (CSSs), described below, are stored in locale-specific folders. The CSSs are designed to provide the style appropriate for the locale including font specifications.

Technical Note: In the preferred embodiment, the Global Store system provides a Client-server interface to the Web Browsers of Buyers around the world using the Internet. (Other communications means may also be used.) Using ASP VBScript write statements, served HTML pages are encoded in UTF-8, mapping from database information in 2-byte Unicode. Whenever information is to be stored for a particular National Language, it is required that the desired glyphs of that language be encoded in Unicode. UTF-8 is a variable multi-byte mapping of 2-byte (16-bit) Unicode.

Cascaded Style Sheets are linked to the server from within written HTML pages' headers, using a "LINK" element. They provide information needed by Client Browsers to render Web pages using a consistent style of display characteristics from one page to another in a given locale. Cascaded Style Sheets also provide streaming fonts when a Client (e.g., a Browser) does not have a particular font that is needed for rendering text on an HTML page.

In the implementation of the above technologies, a communication standard is HTTP, version 1.1. The standard for rendering Web pages is HTML 4.01.

The Global Store 1500 acquires a global network of Referral Websites 1600 having HTML Web pages 1610 that display Global Store "Department" names in the language of a Buyer. The preferred language is deduced from the Buyer's visit to a Referral Website serving a particular language/locale. Buyers are invited to click on a Department (e.g., "Women's Fashions") to view selected products that are for sale. Referral Websites are paid commissions on sales. A Referral Website identifier (ReferID) is a numerical identifier used during a settlement process to allocate commission credits for product sales. A ReferID value is forwarded to the Global Store as part of a visit to the Store by a Buyer who requests Web pages served by the Global Store.

A Buyer, who has TCP/IP access to the Internet 1300 by the Buyer's Computer 1200, views Web page displays rendered by the Buyer's Web Browser 1210. A Web page 1610 that comes to the Buyer's Browser over the Internet from a Referral Website 1600 contains an embedded HTML Form which allows the Buyer to send an HTTP request to the Global Store 1500 to request Client/server function-specific and locale-specific responses.

Options for a Buyer to submit requests to the Global Store System 1500 are designed to transmit to the Global Store parameterized information that enables great power and flexibility of the Global Store to respond to Buyers. System parametric values, called Tokens, are passed along with a Buyer's requests. Locale-identifier Tokens (LCID values) trigger the Global Store System 1500 to accommodate to the Buyer's language and locale. Other Tokens, as described below, allow the Global Store to offer the Buyer choices for viewing information about many thousands of products for sale, those choices conveniently and clearly arranged in drop-down menus in the Buyer's language.

Passing of Tokens allows major components—platforms—of the Global Store System to interoperate in a multitude of system states. Use of Tokens allows Global Store platforms to have interoperable congruency and also to have congruency with the platform of a Buyer—the Web Browser 1210 that operates on the Buyer's Computer 1200. Interoperability is achieved between platforms because Tokens, when passed across interfaces between platforms, set states that affect a particular function that is realized by parameterized operations taking place across those platforms.

Interoperability between platforms in the Global Store System is shown, for example, to result even from the first contact of the Buyer with the Global Store System 1500, when the Buyer clicks on a Department name. The role of Tokens is shown, as follows:

1) A Node1ID Token identifies a particular product Department selected by the Buyer. It is contained as a hidden value in an HTML Web page 1610 served to a Buyer over the Internet 1300 from a Referral Website 1600. It is passed to the Global Store's IIS Web Server Platform 1520 via the Internet 1300 and a Local Area Network 1580.

2) An LCID Token is made available by a SetLocale statement used in a locale-specific server script in the IIS Web Server Platform 1520. As described in detail below, the server script is contained in one of a plurality of locale-specific Server Folders 1524, a folder which is named with the LCID value of the Buyer's locale.

3) The LCID Token and the Node1ID Token are passed by the IIS Web Server Platform 1520 to the Global Store's Database SQL Server Platform 1550. The Node1ID Token, in conjunction with the LCID Token, allows the Database SQL Platform to retrieve the proper information and in the proper language to populate a menu for the Buyer's use. That menu helps implement the first step of a four-step, menu-driven process that the Buyer uses to select a Category of products for viewing. That process is described in detail in a later section.

Technical Note: The HTML body of the Referral Website Web Page 1610 includes an embedded FORM container that includes an "action" attribute to the "Form" HTML element. An abbreviated example of a Form container is shown as follows:

<FORM method="post"
action="http://www.firstglobalstore.com/3081/Frameset.as p" lang="en-au" ACCEPT-CHARSET="UTF-8"

```
<table><tr><td><p>
<input type="hidden" name="ReferID"
    value="1056">
<input type="hidden" name="LCID"
    value="3081">
<select name="Node1ID" size="4">
<option selected> Department </option>
     <!-Comment:
     An abbreviated list of name
     option pairs is as follows: >
<option value="100"> Electronics </option>
<option value="110"> Health </option>
<option value="120"> Women'Fashions </option>
</select>
<input type="submit" Name="Submit Selection">
</p></td></tr></table>
</form
```

Regarding the above example:

1) The use of the Form's "Post" method enables an associated server script, identified as "Frameset.asp" in the URI, to access the Form container information for use by an ASP server script in the IIS Web Server Platform 1520. The Form container information is transmitted to the server via an HTTP Form-submitted request that also invokes the ASP script through the URI-indicated file Frameset.asp that is located in a "3081" folder on the server, the folder that is specific to the locale identified by the value 3081.

2) When the Buyer clicks on a selected name (e.g., Women's Fashions), the numeric value (Node1ID) of the selected name/value option pair is included in the Form information that is sent to the server. The numeric value is locale-invariant in identifying a node value for the first level of a taxonomy that is used for categorizing products. Name labels associated with the values are in English for use in an English-speaking locale. The name labels would be expressed in other languages in other locales. The taxonomy is described in detail in a later section.

3) The Form container also includes "hidden" variables, Tokens, that have numeric values that do not vary even while displayed text strings in the Form vary according to the National Language of the Buyer's locale. Hidden variables include LCID and ReferID.

The IIS passes the HTTP request to the ASP parser (Asp.dll) for parsing the URI and creating a new session for the indicated server script, Frameset.asp. The Frameset.asp server script first establishes the locale parametric value of the server-script session via a "SetLocale" statement in Frameset.asp. For example, a set value of "1031" for the session would be the same LCID value used for the "3081" name of the server folder containing the "3081" version of Frameset.asp. A separate method is used to set a locale for a session when a Cookie 1220 is installed on a Buyer's computer during a product-purchasing process, as described below.

The Global Store responds to a Buyer's request for product views by dynamically writing and sending a Locale-Specific Category Selection Panel. The panel is sent via a sequence of HTML frames that include HTML embedded Forms (one for each of four drop-down menus used in navigating through a taxonomy to select a Category). The Buyer interacts with the Global Store using HTTP protocol whereby the information is conveyed by an integer identifier associated with a name in the Buyer's National Language. The Buyer's HTTP requests are assisted by a separate Client-side JScript for each menu in the four frames. Having received the Locale-Specific Category Selection Panel, the Buyer selects a Category of products to view, that selection being a culmination of using a series of four drop-down menus. (The selection process involves the Buyer navigating a four-level hierarchal taxonomy that is used for organizing products. That taxonomy is described in detail in a later section.)

At the end of the Category selection process, a Buyer selects a nodal value (Node4ID) from a menu showing choices at the fourth level of the hierarchal taxonomy. That modal value is used as a Token, a value that will be passed (along with the Buyer's LCID) by the IIS Web Server Platform 1520 to select appropriate product records from Relational Database Tables 1554 in the Database SQL Server Platform 1550. That process, using Named Stored Procedures 1552 to select product records for display, is described in detail in a later section.

Should the Buyer select a product for purchase, the purchasing process is supported by a Payment Processing Service 1440, one of the Ancillary Resources 1400 in the Virtual Channel. When the purchase is completed, e-mail messages are sent to (a) notify the manufacturer that a product has been purchased and the product needs to be shipped and (b) confirm the order with the Buyer. The e-mail messaging is supported by the SMTP E-Mail Server 1560. In the preferred embodiment the e-mail server is the Microsoft (RTM) Exchange Server.

A Global Store application script that provides a means to collect any taxes that are due for the purchase of a product operates in conjunction with an external Tax Computing Service 1450, one of the Ancillary Resources 1400. The interface with the Tax Computing Service is provided by one of the Global Store application programs included under the rubric "Applications for Interfacing of Ancillary Resources" 1530.

Other Ancillary Resources Allow the Global Store to Access

1) Currency Rates Information Service 1430,
2) Payment Processing Service 1440,
3) Manufacturer's Shipping 1460, and
4) Carrier Website for Shipping Rates and Parcel Tracking 1470.

The art that is used to access the above sources of information is well known and easily implemented by one normally skilled in the art of using services made available on the Internet.

Taxonomy: Metaphorical Layout of Products in the Global Store

The Global Store is visited by a Buyer at the invitation of a Referral Website. The invitation is accepted when the Buyer clicks on a link that the Buyer sees on a Web page at the Referral Website. That click causes a request message to be sent from the Buyer asking that information be sent from the Global Store.

The request message automatically also contains information about the locale where the Buyer is assumed to reside, based on the primary locale served by the Referral Website. The information about locale allows the Global Store, metaphorically, to direct the Buyer to the proper linguistically compatible and culturally compatible "floor" in the "multi-storied" Global Store. The Buyer is sent to a virtual floor matching the language and culture represented on the Referral Website.

All virtual floors of the Global Store are similar with respect to the products that may be viewed and purchased, but the virtual floors are different in respect to language and custom. Stated another way, the Buyer gains automatic access, via the Referral Website and the Buyer's computer, to a virtual floor of the Store on which all business is conducted in a way to accommodate to the language and customs of the Buyer's locale.

The layout of products is essentially the same on the various virtual floors within the Global Store. Products are organized in a way that manifests an underlying taxonomy, a taxonomy which is not dependent on the use of any certain National Language. The taxonomy of product organization is represented on each virtual floor, still metaphorically speaking, by the following layout:

1) the virtual floor is sectioned into a number of product Department virtual areas;
2) each Department virtual area is sectioned into a number of product Group virtual spaces;
3) each Group virtual space is sectioned into a number of product Family virtual aisles; and
4) along each Family virtual aisle are a number of product Category virtual display cases.

Having navigated his or her way to the proper Category display case, the Buyer then views the products for purchase. Help is given to the Buyer for navigating and purchasing in the Buyer's National Language.

Thus, the Global Store System provides a drill-down, four-step navigational process to a buyer, allowing the buyer to find a Category of products to view. The process involves the sequential use of a series of four linked menus, and the choices available in the menus are dynamically determined from each prior choice. After the first menu, showing Departments and allowing a buyer to choose a Department, the item choices shown in subsequent menus are those items that are in a "child" relationship to the "parent" that was the choice in the prior menu. A buyer chooses:
1) a specific Department of products from among a multitude of Departments,
2) a specific Group of products from among a multitude of Groups that are children of the parent Department that was chosen,
3) a specific Family of products from among a multitude of Families that are children of the parent Group that was chosen, and
4) a specific Category of products from among a multitude of Categories that are children to the parent Family that was chosen.

The clarity and convenience of the taxonomy is shown above. Its power is seen by looking at the number of products that could be conveniently found if there were only 20 divisions at each level of the taxonomy. Twenty Departments, times 20 Groups per Department, times 20 Families per Group, times 20 Categories per Family, times 20 products per Category equals 3,200,000 products. Furthermore, the number of products that could be viewed would be twenty times larger than that (i.e., 64,000,000) if another level of "Subcategory" were added to the taxonomy.

Following are characteristics of the taxonomy:
1) There is but one taxonomy serving all the locales, the linguistic versions being functionally equivalent with respect to organizing products into a four-level hierarchy that is useful for Buyers in their respective locales around the world. Therefore, this taxonomy, while localized in presentation to each locale, provides a standardized and internationalized way of accessing the same database tables.
2) There is a unique path down the hierarchy to arrive at a selected product Category on the fourth Level. That is, one, and only one, set of four nodes is used to navigate down the hierarchy from a Department level to a Category level. However, an individual product may be assigned to more than one Category level node, thereby allowing flexibility in how products are found.
3) Nodal numeric identifiers are created in the ISO-8859-1 16-bit character set and faithfully mapped into ISO1036 Unicode-equivalent code for storage and use. Because nodal numeric identifiers are numeric values and not language-based labels, they are language/locale-independent. A Unicode Repertoire and code set is used throughout, as prescribed by HTML 4.01. System numeric identifiers, including all Taxonomy node identifiers and locale identifiers, are in Unicode.
4) Each nodal numeric identifier has an associated array of name attributes representing the multitude of languages served across different locales. Names are chosen to allow maximal coherence in meaning when translated to other languages while still being idiomatically acceptable in the native language. Round-trip translations would tend to return the original word.
5) Child names (i.e., the nodal names in a lower level associated with a nodal name on the next higher level) are semantically derived, a parent nodal name providing the semantic context for a child name.
6) The Taxonomy's dynamic four-step menu-driven selection process is standard across all locales, using a locale identifier as a parameter. Each menu choice automatically leads to an opening up and populating of a new menu. The new menu is populated with the names of a multitude of child node names (a) associated with a chosen parent node name and (b) expressed in the National Language associated with the locale identifier. (See Locale-Specific Category Selection Panel, below.)

Overview of Operations of the Global Store

Figure 2:
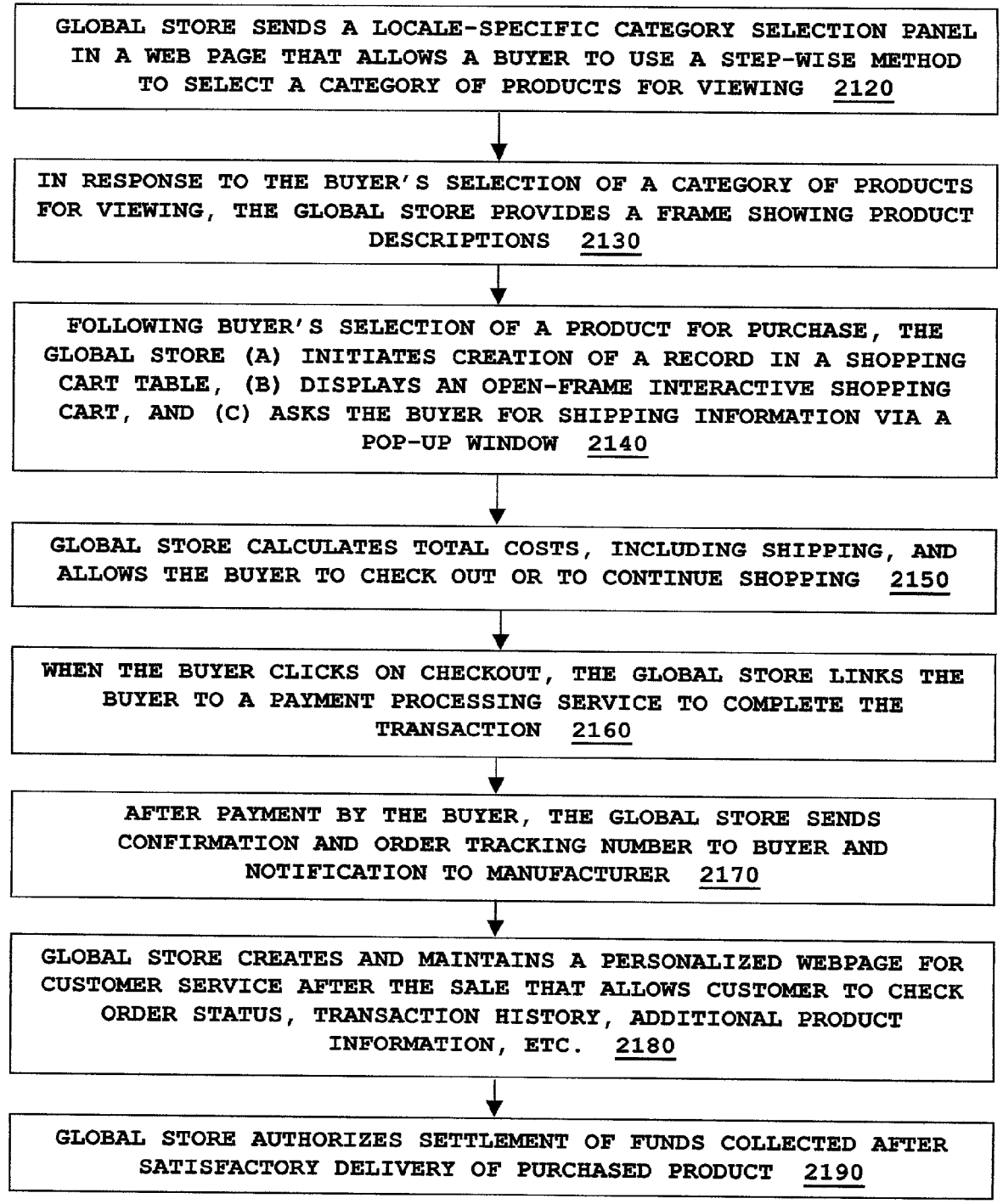
FIG. 2 is a flow diagram illustrating the sequence of operations followed by the Global Store to provide information and products from manufacturers to Buyers across barriers of language, culture, and nationality.

As shown in FIG. 2, the system uses the following numbered operations in bringing manufacturers' products to Buyers:
1) Operation Number 2120: The Global Store sends a Locale-Specific Category Selection Panel in a Web page that allows a Buyer to use a step-wise procedure to select a category of products for viewing. The selection panel is in the Buyer's language, the dominant National Language used in the locale of the Referral Website. The steps for selecting a category of products include using drop-down menus for first selecting a Department of products and then, sequentially, a Group, a Family, and a Category of products.
2) Operation Number 2130: In response to the Buyer's selection of a category of products for viewing, the Global Store provides a Frame showing product descriptions. Information necessary to provide product descriptions is taken from a single, multi-lingual global database that stores product information in a plurality of language versions.
3) Operation Number 2140: Following the Buyer's selection of a product for purchase, the Global Store (a) initiates creation of a record in a shopping cart table, (b) displays an Open-Frame Interactive Shopping Cart, and (c) asks the Buyer for Buyer information via a pop-up window. The pop-up involves the Buyer interactively by asking for the destination of the purchase in order to display shipping costs in the open shopping cart frame.
4) Operation Number 2150: The Global Store calculates total costs, including shipping, and displays the total costs in the Open-Frame Interactive Shopping Cart. The Buyer is given the option of going to checkout or continuing shopping.
5) Operation Number 2160: When the Buyer proceeds to checkout, the Global Store links the Buyer to a payment-processing service. The Buyer's credit card, for example, may be charged for the purchase.
6) Operation Number 2170: After payment by the Buyer, the Global Store confirms the purchase to the Buyer, provides an order tracking number so the Buyer may track the status of the Buyer's order, and sends a notification of the order to the manufacturer(s) of the purchased product(s).
7) Operation Number 2180: The Global Store provides (automatically generates) a personalized, event-driven customer service Web page for the use of the Buyer. The Buyer is given information on how to access the page and what features are offered. The Buyer may access the Web page for information about order status, transaction history, additional product information (e.g., warranty, repair service, accessories, etc.), any current customer retention promotions offered by the Global Store, and information about how the Buyer may contact customer service representatives.
8) Operation Number 2190: After the product(s) has been delivered to the Buyer and a grace period for returns has expired, then the Global Store authorizes settlement of funds from the Buyer's payment to the manufacturer and the Referral Website.

Each of the above operations is explained in greater detail in following sections.

Locale-Specific Category Selection Panel

The Locale-Specific Category Selection Panel (LSCSP) is presented to the Buyer in four persisting frames on the Buyer's computer screen. Each of these frames contains a menu that enables a Buyer to make navigational choices. Making those choices involves the Buyer in a drill-down process that leads to selecting a number of products to view. The Buyer navigates within the Global Store, using menus on the LSCSP to traverse from Department to Group to Family to Category. The choice of a Category causes the display of a number of products.

> Technical Note: A selected menu item is associated with a specific numeric value that becomes a Token, a parameter that transcends platform interfaces to enable functions to be performed using cooperating platforms. For example, selection of a Category name causes the transmission of a Tokenized Node4ID value to the Global Store IIS Web Server Platform 1520 that affects selection of a Named Stored Procedure 1552 on the Database SQL Server Platform 1550. The stored procedure selects from the database product information for products at the fourth (Category) Level of the Taxonomy.

At the same time the four frames for the LSCSP are created, two other frames are also specified as parts of a Frameset. The six-frame Frameset contains 1) Frames I to IV—four narrow frames of the Locale-Specific Category Selection Panel that extend across the top of the page and have zero-width margins,
2) Frame V—one large central fame which is used to display product information, and
3) Frame VI—a narrow frame across the bottom of the page to accommodate an Open-Frame Interactive Shopping Cart.

A Frameset, Frame I, and Frame II are returned from the server in response to an HTTP request (a Node1 request) initiated when a Buyer selects a Department name for products to view from a Web page obtained from a Referral Website. The request is submitted using HTTP from an HTML Form containing a menu with a list of locale-specific Department item options for the locale in the language of the locale.

A Client-side JScript is triggered when the Buyer clicks on one of the locale-specific Department names presented in the HTML Form's menu. The JScript causes a Form-submission of numeric system parameters (including LCID and selected Node1ID value) that initiates the Node1 HTTP request for an LSCSP. The use of an HTML Form for this function was shown as an example in a prior section.

The LSCSP is constituted as four separate frames with a zero-width border between them. The first menu populates the first frame. It contains the same Department item options as appeared on the Referral Website referral page. (This feature allows re-navigation of the taxonomy, re-starting at the Department level as well as any other level of the Taxonomy.)

> Technical Note: This section contains a lengthy, detailed description of how software applications enable the drill-down process for use by the Buyer when the Buyer uses menus in the four frames of the LSCSP. In the interest of conciseness, technical descriptions in subsequent sections will refer back to this section, thereby eliminating unnecessary repetition. This description applies to ASP scripts for all frames.

Frame technology specified is described in HTML 4.01 Specification and assumes compliant Browsers. A separate, locale-specific ASP server-script is provided to interoperate with (a) each separate frame and (b) an associated Stored SQL Procedure in the SQL Server. Tokens are used among the platforms to accommodate interoperability. Each server-script accommodates internationalization and localization goals by use of (a) 16-bit Unicode, UTF-8 multi-byte Unicode and (b) a locale-specific linked Cascaded Style Sheet in a locale-specific Frameset Header. These locale-specific scripts serve to provide locale-specific HTTP responses necessary for each Frame in every locale.

Server-side, a buyer-initiated request is first received by an Internet Server Application Programming Interface (ISAPI), the routing software of the IIS Web Server Platform 1520. The Form-submitted request from a Referral Website Web page, including a selected Node1ID Token, invokes an ASP script (Frameset.asp) that was contained in the URI used by the Form to submit the request. Also contained in the URI is the locale-specific server folder name for the folder containing Frameset.asp. This script provides, as detailed below, a locale-specific server response that dynamically generates a six-frame Frameset.

Another ASP script, contained in the locale-specific folder, is chain-executed at the end of the parsing of Frameset.asp. That script, Frame1.asp, using the Node1ID Token as a system parameter, populates Frame I with a menu of Department names expressed in the Buyer's language and with the selected Department name shown as pre-selected in the menu.

Dept.asp, executed at the end of Frame1.asp, generates a menu for the "children" of the selected Department: a locale-specific Group drop-down menu appears in Frame II, thereby enabling the Buyer to take the next navigational step—choosing a Group.

The Frameset created by Frameset.asp is a housekeeping function that that reserves certain areas on the Buyer's computer screen for display of different, persisting interactive areas. That function is a well-known method of frame-setting that allows IIS Server Scripts 1522 to send HTML pages to independent areas. Selection of a menu item in one frame, in conjunction with a Client-side JScript, triggers a server script that targets its result to another frame. Selection of a menu item in that frame similarly triggers another server script that generates a result for another frame with the menu in the first frame remaining, and so on. In this case, the frame-setting operation specifies four frames that hold the LSCSP in a narrow strip across the top of the screen. Two other areas are named and specified in Frameset.asp: (a) a fifth frame wherein product displays appear in a large central area of the screen and (b) a sixth frame wherein a shopping cart display appears in a strip at the bottom of the screen. Each Web page created from the server is made locale-specific by using a locale-specific server-side Include script.

Frameset.asp invokes ASP and IIS to establish a new Buyer's session upon the buyer's clicking on a Department name by having ASP/IIS install a cookie in the Buyer's Browser. That cookie contains the session's SessionID value automatically generated by IIS/ASP. For subsequent buyer-initiated requests, until timeout, IIS and ASP working together automatically connect a buyer's further-initiated HTTP requests to the already established session. This enables ASP scripts to have access to system variables established by an initial request invoking Frameset.asp from a Referral Website Web page. System Token Parameters (Node1ID and ReferID) for the session are obtained from the Request-.Form collection and are established as session variables for subsequent Buyer-initiated requests where the Cookie SessionID is the same. Frameset.asp invokes a VBScript statement to obtain Node1ID and ReferID Token values from the Request.Form Collection. These values are set in Frameset.asp script as system variables for the session established above for purposes of being available to succeeding buyer requests in steps below. The LCID Token is established for each locale-specific server script when a SetLocale statement is used in the script to set the LCID value. That SetLocale statement sets a different LCID value for each version of Frameset.asp, one version of which is contained in each of a number of locale-specific folders. Those folders are named with the same differing values as the LCID values that are set.

When a Buyer clicks on a Department name JScript procedure is invoked that initiates an embedded Form's Action attribute that sends hidden LCID and ReferID Tokens and a selected Department Node1ID/Node1Name pair to the Global Store. ISAPI receives and passes the URI-contained file name, Frameset.asp, in the Form statement to an ASP.dll parser which in turn accesses and parses Frameset.asp from the URI-referenced IIS server folder.

When the Frameset.asp script establishes frames in the Buyer's Browser, an HTML document is written that describes frame layout (called a Frameset document). That document includes a HEAD section, and a Frameset section in place of the BODY of a regular Web-page. A Frameset defines how the screen is divided into separate parts. The Frameset has different attributes that can be specified such as frame width. The Frameset statement provides frame names that designate "Target" locations for sending server-side script response output.

Frameset.asp (a) creates the initial empty six-frame Frameset and (b) executes a second script, Frame1.asp, that generates a drop-down Department menu for Frame I. Frame1.asp, in turn, executes a third ASP script, Dept.asp that generates a drop-down Group Menu for Frame II. (Frames III through Frame VI are left empty.) Subsequent ASP scripts, described below, are designed to respond to specific choices in the menu items. The use of Frameset technology requires that when a Form-initiated request is action-triggered by a choice of an item in the menu of a frame, a Target must be used as an attribute of the HTML Form statement; the Target designates a frame to receive a response to the request.

The LSCSP is presented to Buyers in their National Languages, rendered on their Browsers in appropriate fonts specified by a CSS. The Global Store writes and sends HTML page output to Buyers' Browsers to populate menu lists in the LSCSP. Doing so necessitates converting to a universal encoding format (UTF-8) that can be rendered in a variety of locales. Furthermore, streaming fonts are specified for use by a Buyer's Browser if the Browser does not have a font set that allows rendering of the sent text.

Technical Note: Text is authored in Unicode in the National Language. Output (writing) of HTML code for HTML Web pages to populate the frames of the LSCSP is accomplished using a Response.Write method of VBScript. Preparation for this necessitates setting Output Encoding for UTF-8 using a "@CODE-PAGE=65001" directive setting in the VBScript. UTF-8 enables ASP to process data scripted in multiple languages when using the Response.Write method. This setting directs ASP-invoked VBScript write statements, for example, to convert stored 16-bit Unicode data obtained from SQL Stored Procedures to the UTF-8 format required of written output for HTTP communications which will be rendered by a Buyer's Browser.

Writing an HTML Frameset Header includes writing a statement informing the Browser of the code set used in a Response. VBScript statements are used to create the output Header instructions to the Browser. For example, the Response.Charset method is used to generate the second line of the HTML header (Response.Charset="UTF-8") that sets the Browser to process UTF-8 encoding.

A written HTML Web Page HEADER includes a LINKED Cascaded Style Sheet (CSS) in a server "link" folder. The CSS provides a method to supply streaming fonts for cases when the fonts are missing during the rendering process by a Buyer's Browser Engine. A "missing font" condition occurs when a Browser fails to have local access to a resident locale font for one or more UTF-8 code points. Streaming fonts are provided to cover the Unicode range necessary for the National Language of a Buyer's locale. Each CSS is locale-specific and is stored in a locale-specific folder, named according to LCID values, as described above. A Browser that is compliant to HTML 4.01 matches the fonts required versus those resident to the Browser. (Browser compatibility with HTML 4.01 specification's vis-à-vis CSS1 and CSS2 style sheets and UTF-8 encoding is assumed for examples given.)

The following example:

<Link REL=STYLESHEET HREF="/css/1031/LCID1031.css" TYPE="text/css" charset="UTF-8" lang="en-us"> is a LINK statement to include in the Frameset Header an externally-linked CSS. The CSS would be locale-specific. The CSS specifies the font preferences for the UTF-8 code points pertinent to the locale and served pages. A shared locale-specific CSS is provided for all HTTP responses to all system Web pages for that locale.

After a Buyer clicks on a Department name at a Referral Website, the Buyer will have his or her selection confirmed; the selected name will be highlighted in a drop-down menu of Department names that occupies the first frame of the LSCSP. The presence of that menu also allows the Buyer to re-start the drill-down process at any time by clicking on another Department name in the menu, thus choosing a new Node1ID and causing new "children" of the newly selected Department name to appear in Frame II. Therefore, along with the Department menu shown in Frame I, also shown to the Buyer is a Group menu in Frame II that contains the names of Groups that are "children" to the selected Department. The Buyer may continue the drill-down process by clicking on one of the Group names.

Technical Note: Frame1.asp is chain-executed from the completion of Frameset.asp. Frame1.asp generates an LCID-specific Department Menu for Frame I and, at completion, executes Dept.asp which populates Frame II with the Group names that are "children" of the Department name that was selected by the Buyer, as is shown in the Department menu of Frame I. Client-side JScript(s) for each Frame support the functionality provided by the server-scripts described.

A locale-specific Recordset used to populate a Department drop-down menu is obtained using a Frame I Stored SQL Procedure to return a Department Node1ID/Node1Name values Recordset. Frame1.asp executes an ADO statement, using the LCID Token, to initiate a Department Stored SQL Procedure. That procedure returns a Department Node1Name/Node1ID pair Recordset to populate the locale-specific Department Menu for Frame I. Frame1.asp writes, using VBScript, a Department drop-down menu as specified in an HTML Form container for Frame I. This written HTML Form is populated with the Department names Recordset described above. The Form, as written, provides a means allowing the Client-side JScript, previously written by this server-script, to submit Form contents upon the event of a Buyer's clicking on a Department name in the drop-down menu. Frame1.asp produces the following Form Statement Attributes within the written Form Container:

1) URI—"http://www.firstglobalstore.com/scripts/Frame1.asp"
2) Form Hidden Fields (Tokens)—LCID and ReferID values
3) Target="Frame1"
4) lang="en-us"
5) Option List display of Node1ID values—one of which is selected by buyer and sent with a Form submission.
6) style=" " (Style is referenced to the localized CSS supplied by an external Link in the Frameset header.)

The Form Container includes an "Option" list of Department names for selection. The names come from the Department Recordset value pairs, as described above. The Form is written such that, when submitted, it sends the selected Node1ID Token along with the other hidden Tokens described above. (Node1ID and ReferID Tokens, as system interoperable parameters, are retrievable in a following step by a Dept.asp server script.)

At the end of the parsing of Frame1.asp, Dept.asp is chain—executed, whereby a Group menu populates Frame II with "children" of the Department name selected in Frame I. The execution of Dept.asp also could take place from the Buyer's, at some point, restarting the selection process by selecting a new Department name from Frame I Department menu. Dept.asp is manifested in locale-specific versions and each version is contained in the same locale-specific server folder as the version of Frame1.asp that initiated its execution. Server-side VBScript statements in Dept.asp write a Group Drop-Down HTML FORM container for Frame II. This written HTML Form is populated with the Group Recordset from a Group Stored SQL Procedure. The Form provides a means to submit Group Form contents upon the event of clicking on a selected option (a Group name associated with a Node2ID value) from a Group drop-down menu in Frame II. Doing so leads to a population of the Family menu in Frame III with Family names that are "children" to the Group name selected. Similarly, selection by a Buyer of a Family name leads to population of the Frame IV Category menu.

For one skilled in the art, the design of the four Frames and menus involves not much more than writing exactly the same code with slight differences in naming for the scripts, Tokens, and Targets involved. For example, Group.asp, Node2ID, and Frame3 are used to populate Frame3 using the same programming steps used for populating Frame 2 using Dept.asp, Node1ID, and Frame2. Therefore, to avoid unnecessary repetition, only the populating of Frame II is discussed in detail below, and no further technical explanation is offered for the remaining Frames and menus used to construct and operate the LSCSP.

After a Buyer selects a Department name, further choices are enabled by population of the Group menu in Frame II with Group names that are "children" of the selected Department name. The following Technical Note describes the programming that supports populating that menu and serves as a model for the same kind of programming used for other menus.

Technical Note: When the Buyer chooses a Department name, the URI in the HTML Form that was rendered in Frame I is transferred to the IIS server in the Form's URI. That URI denotes a version of the ASP script named Dept.asp held in a locale-specific server-side folder. Dept.asp obtains a locale-specific Recordset to populate the Group drop-down menu by using a Frame II Stored SQL Procedure to return a Group Node2Name/Node2ID values Recordset. Dept.asp executes an ADO statement, using the LCID Token, to initiate a Group Stored SQL Procedure which returns the Group Node2Name/Node2ID pair Recordset to populate the locale-specific Group Menu for Frame II. The written HTML Form for this example has the following Form Statement Attributes within the written Form Container:

1) URI is "http://www.globalstore.com/1031/Group.asp"
2) Form Hidden Fields (Tokens) are LCID and ReferID values.
3) Target="Frame2"
4) lang="en-us"
5) style=" " (Style is referenced to the localized CSS supplied by an external Link in the header.)
6) The Form container includes an "Option" list of Group names for selection from the Group Recordset of Group name/node pairs. The Form is written such that, when submitted, it sends the selected Node2ID Token along with the other hidden Tokens delineated above. (LCID, Node2ID, and ReferID Tokens are later retrievable by a Family.asp server-script as system interoperable parameters.)

The User Interface (UI) Text, in the language of the locale-specific Include, is written by a VBScript procedure into HTML output that can be rendered by the Buyer's Browser for viewing by the Buyer.

If a Buyer wishes to go back to a previous step in the Taxonomy drill-down process, that is possible. The Buyer may choose to find a new Category of products to view in Frame V by re-starting at any step of the drill-down process by first selecting a (a) new Department, (b) new Group, (c) new Family, or (d) new Category. This method allows complete flexibility to search new categories while keeping previously chosen products already selected for purchase in a shopping cart in Frame VI.

By completing the drill-down process enabled by the LSCSP, the Buyer, at end, selects a Category of products to view. The following section describes the operation of providing in Frame V views of those selected products.

Display of Product Information

Having made use of the Locale-Specific Category Selection Panel to select a Category of products to view, the Buyer receives a Web page displaying a number of products—their descriptions, images, prices, and links for getting more information about a product. Among the Relational Database Tables 1554 in the Database SQL Server Platform 1550 is a table named "P" that contains product information in various locale/language-specific versions. Product information that is available for display is stored in product records in relational database table P. Those records, found in different versions for all locales served by the Global Store, include the following fields:

1) ProdID—Product identifier, a key field.
2) LCID—Locale identifier of the Product Version of this record, a key field.
3) Start-Date—Date a product description version becomes available.
4) Stop-Date—Date a product description version expires.
5) RevID—Product Revision number facilitates archiving and retrieving old product record versions for customer support. RevID is useful to customer service to review information available at the time of a past purchase.
6) ProdINV—Product inventory level. Adjustment to level numbers are made by an off-line maintenance procedure well known in the art.
7) ProdTitle—Product Title used in display pages in the National Language of locale indicated by an LCID value.
8) ProdDscr—Product information text for both a short description and a long description. Clicking on a prompt offering a longer description (e.g., "More Information") invokes a Client-side script in the Web page that causes additional, previously non-displayed text to be displayed in a small rectangle.
9) MnfProdID—Manufacturer's product identification number.
10) Colorattr/Sizeattr—Two fields each containing a comma-delimited text string containing Color/Size Choices of the ProdID of this record. These choices appear in Buyer's Browser in a color/Size drop-down menu that includes the table for color/size choices for the product. (An empty field indicates no color/size choices.) The National Language of the locale is used.
11) MnfURLThumb—Manufacturer's URL for product graphic thumbnail, i.e., hypertext string for return of the thumbnail.
12) MnfURLGraphic—Manufacturer's URL for product graphic, i.e., Hypertext string for the compressed graphic. The hyperlink is Clickable within the area of the thumbnail.
13) Weight—in Metric units.
14) Weight—in US units.
15) CustDays—Days for custom order fulfillment. If a product is assigned to product Category that is custom manufactured, this field provides the number of days required to fulfill an order.
16) Price—Product Price. Price is stated in currency of the locale identified by the Manufacturer's LCID. (Price quotations in other currencies are calculated by using exchange rates, updated daily, using a Currency Rates Information Service 1430.)
17) FulfillID—identifier of the locale-specific fulfillment center from which the product will be shipped.
18) CarrierID—identifier for the Carrier designated by the manufacturer for the product in the locale.
19) OptionID—identifier for a product as having optional features for custom ordering.
20) TaxClass—the classification that the product has for purposes of taxation.
21) BulkID—identifies with value "1" that a product is available for sale in wholesale quantities.

Products selected for viewing are presented in a manner to accommodate the Buyer's language and culture. Metaphorically speaking, on one floor of the Global Store (a floor designed for service to English-speaking Buyers), the Buyer might see a Web page display of "Women's Jackets" with descriptions in English; while a German-speaking Buyer would see, on another floor of the Store, the same products but labeled "Damenjacken" with descriptions in German.

Major specifications and features of the display operation are as follow:

1) Multiple versions of product records, describing the same product, may be stored in the database. Each version contains a different value in an indexed, numerical field named LCID. An LCID value identifies a specific locale and language.
2) Each version of a record is stored in 2-byte Unicode. That storage system makes it possible for the database to store each version in the National Language associated with a particular locale. Thereby, the Global Store product database provides for storing and retrieving comparable information in different versions for use across many locales and languages. Information stored in the database is generally stored in the National Language of each locale, encoded using Unicode where the entry method is one that matches a desired glyph with a matched Unicode code point.
3) LCID values of different versions of product records are recognizable and interpretable by software in the IIS Web Server Platform 1520. Each LCID value is interpreted to identify a particular language/locale because that association is embedded internally by IIS/ASP software. This feature facilitates interoperability between (a) the database platform that delivers locale-specific product records in 2-byte Unicode and (b) the Web server platform that processes the records in producing UTF-8 display Web pages. Without the interoperability feature provided by using an LCID value, passed as a Token between platforms, the Global Store would be a Tower of Babel. It would be unable to process and deliver understandable and appropriate content to a Buyer in the Buyer's National Language. The LCID parameter is set in the locale-specific Disp.asp script version so that any VBScript write statements produce correctly formatted numbers, currency symbols, etc. The LCID value also allows the Web server properly to obtain correct locale-specific product information version from the database platform. That information is processed in the preparation of locale-specific Web pages. After being converted from 2-byte Unicode, the information is sent in Web pages via UTF-8 (which can be transmitted over the Internet) to a Buyer's Browser to be rendered in the National Language of the Buyer. (Technical Note: IETF policy strongly recommends use of locale, according to "Policy on Character Sets and Languages," RFC 2277, January, 1998. Externally-received LCID values are equivalent to LCID values set internally in Microsoft's (RTM) IIS/ASP.)
4) If, on a Buyer's Browser, fonts are missing that are needed to render UTF-8 code points/fonts for a transmitted Web page, streaming fonts are used. Those fonts are supplied to the Buyer's Browser by using an HTML LINK statement that is found in the transmitted Web page header. That link includes a URL for an external Website from which a missing fonts are downloaded. Those fonts are specified in the CSS.

5) If a product is restricted for any reason from being sold in a locale, no version of product information will be available in the database for display of that product in that locale. That is, there will be no product record version with an LCID value which is the value that designates the locale where the product is not to be made available.
6) Because the Database SQL Server Platform 1550 is independent from the IIS Web Server Platform 1520, Relational Database Tables 1552 are independent from Server Scripts 1522. Thus, changes can be made to the database without modification to the scripts. This feature allows powerful flexibility in the ability to display new products to new Buyers coming from new locales. All that is needed is to add new locale-specific versions of product records to the database.
7) Multi-valued attribute lists (e.g., Size) may be provided for drop-down menus in a product description to be returned to the Buyer. A comma-delimited string of the attribute values for a drop-down list are stored in a field in a product record.
8) Using a Start Date and a Stop Date in fields in each product record allows control over the availability of a product display for viewing. To track changes in product descriptions, a revision identifier, RevID, tracks a switch from making available an old display to making available a new display. The Stop Date for the old display with an old RevID is the Start Date for the new display with a new RevID. This method enables staging version changes for displays across all locales simultaneously. Furthermore, old product information is archived efficiently using RevID, and the database does not become encumbered in its operations by obsolete records.
9) The multi-version database is integrated to support worlds writing systems, represented in Unicode Repertoire, using two-byte Unicode character code.
10) Prices are adjusted daily in a maintenance mode. The price is fixed in the currency of manufacturer's fulfillment center. The price in other locales is adjusted daily to compensate for currency fluctuations. The product price in the selected currency is converted for all locales into the official currency of the locale. This converted price is updated daily, during an off-line maintenance cycle, and is updated en-masse for all products for all locale versions.
11) The American National Standards Institute (ANSI) and the International Organization for Standardization (ISO) have adopted Structured English Query Language (SQL) as a standard data sublanguage for relational databases. The current version of the SQL standard is SQL-92 (ANSI Document No. X3.135-1992). Although SQL is standardized, most implementations of the ANSI standard have subtle differences. Nonetheless, the standardization of SQL has greatly increased the utility of relational databases for many applications, including retail sales and merchandising operations, which is of particular value to the present invention. Microsoft SQL Server is implemented in Windows 2000 (RTM) and provides SQL access.

The product database is implemented on an SQL server. Access to data occurs when a calling process from the Internet server passes Tokens for the Locale of a Buyer and the product Category selected by the Buyer. The SQL Server includes a Named Stored SQL Procedure (Category) to receive "calls" from the Information Server in response to Buyers' requests from around the globe in a variety of locales having different languages. The Category Stored SQL Procedure receives a call and associated Tokens for locale (LCID) and product Category (Node4ID). These Tokens are used in all locales on Referral Websites around the globe. All incoming requests flow through the same server-side script with the same script call to the same Category Stored SQL Procedure. In turn, the Category Stored SQL Procedure accesses the same product table for product descriptions.

Technical Note: The same general method is used by the server to send a display of product information to the Buyer as was used in responding to the prior request that caused menus to be displayed in the Locale-Specific Category Selection Panel. Because a description of that method was provided in detail in the prior section, the description here of providing a display of product information does not need to be as technically detailed.

A request to display product information comes from using a "Post" method of an HTML FORM-submitted HTTP request containing a URI and hidden variables (Tokens for LCID and Node4ID values). The request submission references in the URI an appropriate asp file name. Specifically, the URI contains references to (a) Disp.asp, a server-side ASP script to be parsed, and (b) the locale-specific folder on the server where the needed version of Disp.asp can be found. The ISAPI extracts the Disp.asp file name from the URI and passes it to Asp.dll (resident in IIS) for parsing, using the referenced Disp.asp script found in its URI-referenced server folder. A Disp.asp version in a given locale-specific folder is specifically designed to process a Buyer's request function and to provide the server response for that Buyer's locale. For example, Disp.asp in folder 1031 is a script for locale 1031 that is different from Disp.asp in server folder 1041 that is a script for locale 1041. A localized Disp.asp script produces localized HTML output that will be rendered by a Buyer's Browser. Preliminary to all that, however, is retrieval of product information from the database. Steps that reach that goal are detailed below:

1) A database table of significance for accessing product information is the Product/Category assignment table (PRODCAT). This table has a product identifier value in one key field (ProdID) and a Category identifier value (Node4ID) in a second key field for each record. This table, therefore, accommodates a many-to-many relationship between products and categories; a product among many products may be related to more than one category among many categories. Use of this table, when joined with the Product Table (P), facilitates selection of all the products in a Category that are requested to be displayed.
2) Category Stored Procedure receives an ADO call from the ASP script Disp.asp with the LCID and Node4ID parameter values. The Category Stored Procedure includes an SQL statement that selects product information by using
   a) P, the table containing product information records for all products with that information repeated in multiple records to accommodate different versions for different locales and
   b) PRODCAT, the Product/Category assignment table where products are shown in different records to be assigned to different Categories. The PRODCAT junction has fields for Node4ID and ProdID. In different records ProdID appears with one of the Node4ID values, thus indicating in that record one of the Categories to which a product has been assigned.

When P and PRODCAT are joined, records are available from the joined table that represent all the versions of product information of a product related to all of the Categories (one or more) to which a product has been assigned.

Shown below is the stored SQL procedure that selects product information into a Recordset using SQL statements with a) a relational table join between tables P and PRODCAT,
b) "Where" conditions using the SelLCID (an LCID value of a selected locale) and SelNode4ID (a Category identifier value selected when a Buyer selected a Category),
c) a "Where" condition to filter out records when product inventory (ProdInv) values are too low, and
d) "Where" conditions to filter out records when the current system date ("DATE") falls outside of the dates when a version of product information is set to be available, i.e., on or after a "STARTDATE" and before a "STOPDATE".

(In the example of an SQL SELECT statement that follows, an "*" is substituted as a wild card indicator for the names of fields of product information. This substitution is made in the interest of brevity and clarity because of the large number of product information fields that would otherwise need to be listed.)

SELECT P.LCID, P.ProdID, P.*
FROM (P INNERJOIN PRODCAT ON P.ProdID=PRODCAT.ProdID) WHERE ((P.LCID="SelLCID") AND (C.Node4ID="SelNode4ID') AND (P.STARTDATE−1<Date( )) AND (P.STOPDATE)>Date( )) AND (P.ProdINV>0))

3) The locale-specific ASP script, Disp.asp, invokes a VBScript procedure that includes an ADO call statement to the above-described Category Stored Procedure, using LCID and Node4ID Tokens as system parameters. The Category Stored Procedure selects product description information from relational database table P in the database and a product Recordset is generated. (That is, the Category Stored Procedure returns locale-specific versions of product descriptions for products assigned to the Category chosen by the Buyer from the menu in Frame IV.) The product Recordset is stored in a temporary database using Transact-SQL statements of the Windows 2000 SQL Server (RTM). (These stored procedures are pre-compiled therefore greatly improving the efficiency of the database execution times.)

Thereafter, the Recordset is returned to Disp.asp from the calling ADO script that initiated the Category Stored Procedure. Disp.asp maps the information received into a localized server script selected to produce HTML output using VBScript write statements as parsed by Asp.dll. The prepared HTML response includes a written header containing HTML elements that are necessary for the response and the locale. Product information is transmitted to the Buyer in a Product Display Web Page in Frame V in a version that is compatible with the Buyer's language/locale in UTF-8 encoding. The computer screen continues to display in four frames the still functional Product Category Selection Panel of the prior step. (The Buyer, when selecting products to view, may restart the selection process at any level of the taxonomy.) Therefore, the computer screen continues to display (a) four frames allowing the Buyer to request product views and (b) a fifth frame displaying products.

Technical Note: Disp.asp provides output to populate Frame V. Frame V holds nested HTML tables composed of individual Cells for pertinent fields of a product record in the Recordset. A VBScript procedure in Disp.asp writes HTML output, including nested-table HTML. This run-time server process uses available technology to bind content of an individual product record's field into its prescribed HTML Cell.

A cursor is used by the enabling VBScript procedure in Disp.inc to navigate in sequential manner all records in the Recordset and to process each product description in an identical fashion as the cursor is advanced from record to record. For each record in a Recordset, product information is merged, field-by-field, into field-specific scripts that, together, produce an HTML "Strip."

A Strip is defined as all of the HTML code written to complete the cells for the display of a single product. That code represents both information from the database and certain invariant, locale-specific content that appears in each display. For example, each group of nested cells contains one cell that is invariantly coded with text that prompts a Buyer to add the product to a shopping cart. In English that prompt invariantly reads "Purchase this Item."

Each Strip comprises a few lines of HTML text, one Strip for each product and in the sequence of the Recordset. A complete page of nested tables for the product description Strips has a constant format from product to product in the HTML page containing the entire display for the Category chosen by a Buyer. A vertical scroll bar in the target frame (Frame V) enables view of numerous products.

Each Product Strip for the Product Display in Frame V includes HTML Cells for the Following: (a) MnfURLThumb—Thumbnail graphic product picture, (b) ProdTitle—Product Title, (c) ProdDscr—Product Description (d) Price, (e) Colorattr—Drop-Down menu for color (if applicable), (f) Sizeattr—Drop-Down Menu for Size (if applicable), (g) MfrURL—URL to manufacturer's product information Web page (if available), and (h) ShipDays—for future delivery of custom-manufactured items (if applicable).

Special details for certain fields and cells are described as follow:

1) MnfURLThumb. A thumbnail graphic product picture also includes a hyperlinked hotspot to a larger picture to appear in a pop-up window.
2) ProdDscr. Descriptive text is included in a Cell that is displayed by an ActiveX Control that is designed to open up a drop-down window to display text for additional product information when a hot-spot is clicked.
3) ShipDays. If an item is custom-manufactured, the number of days until item is shipped is shown.
4) Price. Price is displayed with the currency symbol of the Buyer's locale. Currency conversion information is updated in the database on a daily maintenance cycle, thus allowing Price to be stated in the Buyer's currency but allowing the manufacturer to be paid an accurate amount in the manufacturer's currency.
5) MnfURL. Marketing information may be supplemented from an external resource: Manufacturer Website for Additional Product Information 1420. That resource is accessible to the Buyer in a pop-up window via a hyperlink.
6) Each individual product Strip display consists of nested HTML that includes an HTML product Form where, when appropriate to the product, its HTML Form serves the functions of (a) providing for selection of a Color Option and a Size Option and (b) submission of the selected options and hidden variables OptionID and ProdID to ShipTo.asp script identified in the URI attribute of the Form "Post" method. When a Buyer selects a Color or Size by clicking on a menu item, that event is monitored by a Client-side Jscript procedure. The selected value is stored by a JScript procedure 7) The Form submission to ShipTo.asp is aided by a Client-side JScript procedure that causes a Form URI submission upon the event of a Buyer checking a box labeled "Purchase this Item." That submission involves sending to the IIS Web Server (a) a URI with the address of a locale-specific folder and the name of the file to be found there (ShipTo.asp) and (b) detailed product information (including ProdID, OptionID, BulkID, ColorID, and SizeID). Parsing of the ShipTo.asp script results in the display of selected products in Frame VI (a shopping cart). When a product is displayed in Frame VI, the selected Color and/or Size selected in Frame V is also shown. The shopping cart function displayed in Frame VI is described in detail later. Key elements of the Form are shown in the following example of a Form that aids the selection of a product by a Buyer in locale 1031:

URI—"http://www.firstglobalstore.com/1031/ShipTo.asp"

Form Hidden Fields (Tokens)—ProdID, LCID, and ReferID.

Target="Frame5"

lang="en-us"

style=" " (Style is referenced to the localized CSS supplied by an external Link in the header.)

In operation, a Buyer (a) selects the color and/or size from a drop-down menu which serves to record the selected color/size value in a Client-side JScript variable and (b) checks the "Purchase this Item" to transfer the product to an Open-Frame Interactive Shopping Cart, described below. Each product's checkbox triggers a JScript form submission process that initiates transfer of the product information, including the selected Color and/or Size option to an Open-Frame Interactive Shopping Cart for display in Frame VI.

Customer, Transaction, and Status Code Tables

When the Buyer clicks on "Purchase this Item," that event initiates further interactive communications with the Global Store, and those interactions are described in detail in subsequent sections. In this section, however, some attention is given to certain in-the-background accounting operations that are initiated at the time a product is selected for purchase. All information in all tables is in Unicode.

First, a unique BuyerID value is created and assigned to the Buyer. That value is placed in a new record in a Customer Table where the key field is BuyerID. Other information about the Buyer is added to the Buyer Table as it becomes available.

Second, a unique transaction identifier (TransID) value is assigned in a new record in a Transaction Table during a session in which a Buyer first selects a product for purchase. At the same time, an ItemID value is also created and placed in another field of the same record. Together, TransID and ItemID constitute a unique primary key for the table. The TransID value in conjunction with the ItemID value allows the system to track a specific purchase of a specific product by a Buyer. The same BuyerID value that was assigned in the Customer Table (above) also is added to the Transaction Table to identify the Buyer and allow ready access to Customer Table information. Fields called Color and Size contain, when appropriate, attributes of Color and Size, as selected by the Buyer.

Third, a code value is entered in a status field in the Transaction Table to provide current information about the latest event in the purchase process the transaction. Every product in a transaction is subject to this status monitoring process. The status field is labeled StatID, and values in that field include numerical codes to signify one of the following transaction status events:

1) Selected—Product added to shopping cart,
2) Purchased—Paid but not fulfilled,
3) Fulfilled—Shipped and in delivery process,
4) Delivered—In escrow period, pending approval,
5) Approval—Yes (no Return authorized) or No (Return requested), or
6) Settlement—Funds transferred to Manufacturer and Referral Website; or funds returned to Buyer.

Fourth, a Payment Table contains records of the payment details for each transaction. A unique PayID value is assigned to a primary key for each record. Other fields include TransID, and fields to identify the payment processing service, total bill in the Fulfillment Center's currency, and total bill in the Buyer's currency (including tax and costs for options in the case of a custom order).

Technical Note: A unique TransID value is created and placed in a new record in a Transaction Table in the database; and at the same time, an ItemID value, unique for the session, also is created and placed in another field of the same record. Together, ProdID and ItemID constitute a unique primary key in the Transaction Table for each product's purchase. That enables a customer support system, described below, to track a plurality of purchases of individual products where those purchases are part of a transaction taking place in the same session. The Transaction Table is updated, step-by-step, until after each purchased product has been successfully delivered and settlements have been made with the Manufacturer and the Referral Website.

Selected values indicating attributes of Color and Size, when appropriate, are placed in fields called Color and Size in the Transaction Table at the time a product is selected for purchase. The Transaction Table also has foreign key fields that, as those fields are updated, provide ready access to details from Buyer, Product, Transaction Total, Payment, Escrow, Manufacturer, Status, Fulfillment, Tax, Settlement, Carrier, Color, Size, Option, and Bulk tables.

Transaction Table records include (a) TransID, (b) ItemID, (c) BuyerID, (d) ProdID, (e) OptionID, (f) BulkID, (g) Number of Products purchased, (h) Product Title, (i) Total Shipping Weight for the product purchased (Metric), (j) Total Shipping Weight of the product purchased (US), (k) Size, (l) Color, (k) Product Price in Buyer's currency, (l) Product Price in Fulfillment Center's currency, (m) StatID, (n) Shipping Cost in Buyer's currency, (o) Shipping Cost in Fulfillment Center's currency (p) Selected Carrier's Service Category, e.g., Two-Day Air, (q) Carrier's Tracking Number, (r) PayID, (s) Carrier's service level, (t) Tax in Buyer's currency, (u) Product Purchase Total (currency in Fulfillment Center's locale), (v) Product Purchase Total (currency in Fulfillment Center's locale), (w) Buyer's LCID, (x) Fulfillment Center's LCID (y) SettleID, (z) Manufacturer's product identifier, and OpOrder1, OpOrder2, . . . OpOrder6 (arbitrarily making available up to six fields to records choices for options when a product is available for custom order), and (aa) Discount (a percentage for volume discount).

The Buyer's Product Purchase Total includes Option Total (if any), Tax, and shipping cost in the Buyer's currency, based on the Buyer's locale. If a Bulk purchase is made, a discount is applied using the discount determined for the number of products purchased. The Manufacturer's Product Purchase Total is the same amount expressed in the currency of the Manufacturer's locale, without the Tax. Tax is added at time of checkout, using Checkout.asp, described below.

Records in the relational Transaction Table can be joined to records in other tables, using Transaction Table foreign key fields that are common to primary keys of other tables. Tables with such fields that common with fields in the Transaction Table are as follow: Customer (BuyerID), Payment (PayID), Escrow (EscrowID), Settlement (SettleID), Shipment (ShipID), Manufacturer (MnfrID), Fulfillment Center (FulfillID), Carrier (CarrierID), Status Code (StatID), Color (ColorID), Size (SizeID), Option (OptionID), Bulk (BulkID), Transaction Total (TransID), and Product (ProdID and LCID). Information required from records in those tables can be related to a specific purchase by using (a) joins between the Transaction Table and the other tables and (b) an SQL statement to query Transaction Table records using, for example, "Where" conditions to identify the purchase of a particular product (ItemID) during a particular shopping session (TransID). Thereby, very complete and detailed information is readily available about a product, its purchase, and its purchaser.

Each change to a StatID value in a Transaction record is recorded as a new record in a Status Table, including the date/time for the change in status. Thus, a permanent history of changes is kept for research and customer service needs. A Status Code identifier (StatID) value is language-neutral. A textual description of a code is provided in another table, Status Name Table, which also provides a descriptive name of the code in different language versions for different locales. The Status Name Table has records that include fields for StatID, Status Code Name, Status Description, and an LCID value of a locale. Thus, the meaning of a StatID value is defined in the Status Name Table in various languages.

Open-Frame Interactive Shopping Cart (OFISC)

In the above section describing product displays it was explained that each individual product Strip display in Frame V consists of nested HTML cells. One of those cells contains an HTML Form (one Form per product) that enables selection of a ProdID value when a checkbox in the Product Strip labeled "Purchase this Item" is checked. An ASP script name, ShipTo.asp, is contained in the URI attribute of the Form's "Post" method.

Technical Note: "Purchase this Item" is rendered in locale-specific National Language as are all other similar text descriptions discussed here. This is possible because Disp.asp has many locale-specific versions. Disp.asp and all of the other scripts corresponding to Buyer's requests serve Web pages that exist in multiple versions. They are all organized to be contained in and referenced by server folders that are named with specific LCID values associated with specific locales.

Form submission is aided by a Client-side JScript upon the event of checking of the checkbox for "Purchase this Item." Submission, via an HTTP "Post" method, sends to the IIS Server the URI and hidden variable values that identify the product selected by the Buyer for purchase: ProdID, ColorID, SizeID, BulkID, OptionID, and Discount. As described above, those values were selected prior to the submission and were stored, where appropriate, in a Client JScript for that purpose.

The IIS Server's ISAPI extracts the file name ShipTo.asp from the URI of the HTTP Form submission and passes ShipTo.asp to ASP.dll for parsing. The URI includes the locale-specific folder address from which ShipTo.asp is obtained. The first step is to obtain Form-submitted product information from the Request.Form Collection and establish as session variables OptionID and BulkID. The second step of ShipTo.asp is to update the Transaction Table with a new record that reflects the selection of a product for purchase, including Color and Size selections, as appropriate.

Third, ShipTo.asp sends a locale-specific HTML Web page that occupies Frame V, replacing the display of products that were in Frame V. ShipTo.asp caches the contents of Frame V display so that the display can be presented again should the Buyer later choose to return to shopping. The new Web page includes a ShipTo Data Entry Form page that is sent to the Buyer's Browser to collect shipping information that includes: (a) quantity of an ordered Product (ProdNo), (b) ShipTo Address, (C) ShipTo City, (d) ShipTo State/Province, (e) ShipTo Country, and (f) ShipTo Postal Code.

The new contents of Frame V also include explanatory text that prompts the Buyer to enter information to specify a destination where the purchased product is to be sent. Associated text in the Web page explains that destination information is needed to arrive at a total cost, including shipping charges.

Technical Note: Drop-down menu choices, sequentially offered, are used as much as possible in collecting destination information. That approach allows standardization of the information into codes for more accurate processing than would be possible with non-coded information.

A destination Country is selected by the Buyer via a drop-down menu. Following selection of a country, the Buyer is next presented with a drop-down menu list of States/Provinces for the Country selected. (This process is similar to that described for the Category Selection Panel, above.) The Buyer then fills in blanks for the number of products, street address, city, and postal code. A Client-side JScript checks for empty fields upon submission. An auxiliary service is used to check for the accuracy of an address, when available. In the event of an error, an error message is sent that specifies the inaccuracy.

The same routine of asking for a shipping destination is repeated each time the Buyer selects another product for purchase. That task is neither time-consuming nor onerously repetitive for the Buyer; the same shipping destination is assumed and pre-entered. A drop-down menu for selecting a country is supplied in case of a new destination. Only when the shipping destination changes from one purchase to another does shipping information need to be entered more than once by the Buyer. The Buyer is always required to enter the number of products being ordered. All the above information is added to appropriately named fields in the transaction record in the Transaction Table, described above.

Each product purchased during a session may have a separate ShipTo address. The ShipTo address is used to determine the shipping cost for delivery by a carrier, the Carrier specified by CarrierID in the locale-specific Product record.

Filling out the ShipTo form and submitting it (a) updates the transaction record in the Transaction Table with ShipTo information and (b) executes a statement that invokes an associated server-side script, Carrier.asp. As Carrier.asp is parsed by Asp.dll, destination information is used to help determine shipping costs for different grades of delivery service to the Buyer's ShipTo destination from a manufacturer's Fulfillment Center location. That location is the shipping point of origin for the manufacturer's product fulfillment.

Within Carrier.asp, a VBScript statement branches to an Include directive. Branching to a specific directive is determined by the value of CarrierID that is found in the locale-specific version of a product record. That CarrierID value is specific to the Carrier nominated to be the carrier to deliver the product to Buyers in the locale of the Buyer. The Include directive to which the VBScript statement branches initiates parsing of a version of an Include script, Carrier.inc. Each version of Carrier.inc is tailored for a specific carrier (CarrierID) and a specific Buyer's locale (LCID). Each Carrier.inc version automatically implements an interfacing method provided by a carrier (e.g., FedEx (RTM) or UPS (RTM)) necessary to access that carrier's Web-based Shipping Rate Quotation Service (SRQS). Carrier.inc provides shipping point-of-origin (ShipFrom) information, destination (ShipTo) information, number of products, and weight to the specified SRQS, as needed to have a quotation returned. An SRQS then returns the costs for different delivery service grades. Costs are determined in the currency of the Fulfillment Center's locale by the SRQS. The cost to the buyer in the buyer's locale is determined by looking up the current exchange rate in a Currency Ratio table, maintained daily, on the Global Store. The Carrier.inc script, invoked from within Carrier.asp, generates and sends to Frame V a presentation with information about grades of service (e.g., ground and air) from a specific carrier and costs for those service options. That information is accessed from the carrier's Website where shipping rate quotations are made—called here a Shipping Rate Quotation Service (SRQS).

Technical Note: Carrier.inc carries out the following steps:
1) obtains shipping destination (ShipTo) information for the product from the Transaction Table,
2) obtains Fulfillment Center (ShipFrom) address information, as designated by the manufacturer for the product (ProdID). That address is accessed from the Fulfillment Table by using the value of FulfillID obtained from its corresponding field in the Product record,
3) calculates the weight for the number of products purchased, based on ProdNo from the Transaction Table and Weight from the Product table,
4) accesses a Carrier's shipping rate quotation service Website (SRQS), using a URL identified in and bound into the carrier-specific Carrrier.inc script,
5) obtains Shipping Costs for different grades of service from the designated Carrier's SRQS using (a) ShipTo and ShipFrom address information obtained above, (b) the calculated weight, based on the weight units used in the locale of the Fulfillment Center, and (c) currency in the Fulfillment Center's locale, and
6) uses a Currency Ratio Table to derive costs in the Buyer's currency.

Upon receipt of the informational response from the carrier's SRQS, Carrier.inc prepares and sends a Delivery Option Display Form to Frame V to display a quoted cost for each delivery service alternative. A Buyer selects a desired delivery service alternative by checking a checkbox.

Technical Note: A description, including price quote, of each delivery alternative is displayed by employing HTML tables containing cells. Each description sent to Frame V includes the following additional information: (a) item Title, (b) Price of the item (each), and (c) quantity ordered (ProdNo). Prices are displayed is in the currency of the buyer.

By checking a checkbox adjacent to a preferred grade of service, a Buyer selects one of the carrier's delivery service alternatives. Each alternative is accompanied by a checkbox that may be checked to select the desired alternative. A JScript procedure monitors the alternative boxes and, upon a checked event, initiates an HTML Form submission. That submission includes a URI that contain Cart.asp as a script name and also the address of a locale-specific folder in which Cart.asp is placed.

By checking a checkbox, the Buyer selects a grade-of-service option for delivery of the purchased product. Upon the event of the Buyer selecting a desired option for delivery, Cart.asp is invoked via the familiar Form-submission "Post" method. Cart.asp (a) updates the transaction record in the Transaction Table to reflect the Buyer's choice of delivery service and (b) prepares and sends an Open-Frame Interactive Shopping Cart (OFISC) display for Frame VI. That display, using information obtained from the Transaction Table, contains all of the products selected for purchase by the Buyer during the session started (many pages ago) at a Referral Website.

The latest product selection is added to the top of the display. The OFISC display in Frame VI is vertically scrollable to enable viewing previously selected products. Frame VI occupies approximately ⅓ of the display space used for Frame V and is located below Frame V.

Cart.asp also sends an informational message to Frame V, saying: "The Total Cost for Your Selected Item, Including Shipping, Is Shown in the Panel Below." Also visible in Frame V, at the bottom, is a navigational checkbox labeled "Return to Shopping."

When the Buyer looks "in the Panel Below," the Buyer sees in the OFISC a list of products that have been selected for purchase, the latest selection at the top of the list. Those listings also show purchase quantity, size and color (where appropriate) and total cost. Total cost includes costs for options, if applicable. Selection of options is described in a later section. Also described in a later section are Bulk purchases and discounts for bulk (wholesale) purchases.

At this point, the Buyer has the option to return to shopping or to proceed to checkout. If the Buyer chooses to return to shopping, Frame V is restored from cache to again render the same product display information that was seen by the Buyer prior to the Buyer having clicked on "Purchase this Item." Should the Buyer return to shopping, the product just selected to be purchased would remain visible in the OFISC in Frame VI at the bottom of the screen.

Upon the Buyer's Checking the "Return to Shopping" Checkbox in Frame V (with text rendered in the Buyer's National Language), Restore.asp provides the function of resending the cached Products Display to Frame V. If the Buyer does not choose to return to shopping, the other alternative is to go to Checkout. That option is enabled by a checkbox visible in the OFISC. The checkbox is labeled "Go to Checkout," as stated in the Buyer's National language.

Technical Note: Restore.asp is invoked an HTML Form-based submission using the Post method, causing the server to invoke the script named "Restore.asp." The submission is made when a Buyer checks a checkbox in Frame V labeled "Return to Shopping." This script has the sole function of restoring the cached Product Display to Frame V.

Checking the "Go to Checkout" checkbox on the OFISC in Frame VI triggers an event monitored by Client JScript procedure to initiate an HTML Form-submission, using the Post method, that sends to the server an HTTP Request, including a URI. The URI includes a locale-specific folder address where the script file, InfoState.asp, is to be found. That script initiates the first step in the checkout process.

Before proceeding to a description of the checkout process, it is necessary to describe below two exceptions to the above procedure in steps taken to add a product to the OFISC. Those exception occur in the event that a selected product is (a) custom-manufactured or (b) available in wholesale quantities, i.e., business-to-business commerce.

Purchase of Custom-Ordered Products

Custom-ordering is important to e-commerce because it allows manufacturers, e.g., Dell (RTM), to provide what customers want while keeping inventories very low. That capability enables an important transition from "push" marketing to "pull" marketing.

For the Global store to enable purchasing of custom-ordered products, an Options step is used that is parallel to the ShipTo procedure described in the above section. Even while this parallel step obtains information about a Buyer's options choices when making purchases of custom-ordered products, this step also obtains ShipTo information as well. A branch to an interactive Web page allows the Buyer to select among custom features of the product selected for purchase and also to obtain ShipTo information. Branching to that page is controlled by the presence of a particular value in the OptionID field of a Product Record. Specifically, a "1" in that field causes a VBScript statement in ShipTo.asp to branch to an Execute statement that invokes Custom.asp script.

Custom.asp writes and sends to the Buyer's Browser a locale-specific Web page that obtains ShipTo information and Option information. The Web page generated invokes a script that sets all of the information received from this form into session variables.

The following are fields required to be in Product Table records to provide option choices. The information in those fields is locale-specific. It is locale-specific in the same manner as other information about products that appeared in product display Web pages, as described above. Furthermore, prices are adjusted in the same manner. Six was arbitrarily picked here, only for purposes of exposition, as the maximum number of option choices that would be available for any one product. These fields are used to access and display option information:

1) ProdID
2) LCID
3) OptName1 through OptName6—Names for six options
4) OptDesc1 through OptDesc6—Descriptions for six options
5) OptPr1 through OptPr6—Option Prices for six options The Product table contains locale-specific records that each include up to six locale-specific fields that contain triplets of information: Names, Descriptions, and Prices of Options.

Custom.asp is Buyer's locale specific. It creates and sends to the Buyer's Browser a Web page with the following features and functions:

1) Custom.asp obtains option information from a product record using ProdID.
2) Custom.asp sends a locale-specific HTML Web page that occupies Frame V, replacing the display of products that were in Frame V. Custom.asp caches the contents of Frame V display so that the display can be presented again should the Buyer later choose to return to shopping. The new Web page includes a (a) ShipTo Data Entry and (b) Custom Option Form page that is sent to the Buyer's Browser. Shipping information includes: (1) quantity of an ordered Product (ProdNo), (2) ShipTo Street Address, (3) ShipTo City, (4) ShipTo State/Province, (5) ShipTo Country, and (6) ShipTo Postal Code.
3) Each custom option is listed in a separate line that contains (a) a title of for the option, (b) a description of the option, (c) price of the option, and (d) a checkbox to select the option, where "1" means "yes" and "0" means "no." These values are recorded for Option Order variables from 1 to N (i.e., OpOrder, OpOrder2, . . . OpOrderN). (For purposes of exposition, N is arbitrarily set at six, but there is no real limit to how many options could be offered.)
4) After choosing among option choices, the Buyer clicks on "Submit." This event invokes a Form-submission procedure that returns a Form collection to the server, including the selected options chosen from the Form sent by Custom.asp. This action invokes a ReCustom.asp script.
5) ReCustom.asp script obtains Form Collection information from Form submission, stores the information in the transaction table, and sets the captured information as session variables.
6) ReCustom invokes an execute command to initiate a locale specific Carrier.asp from a locale-specific folder. At this point, option choices have been made and the process continues with Carrier.asp just as it does with products that do not have options to choose.

Wholesale Purchases

In the Global Store, for a product to be purchased in wholesale quantities, a "Bulk" step is used that is parallel to the ShipTo procedure described in the above section. For a product that is sold for discounts in quantity, that step involves branching away, temporarily, to present another interactive Web page, a page that allows a Buyer to determine the number of products to order. Even while this parallel step obtains information about the quantity of a product that the Buyer chooses to purchase at wholesale prices, this step also obtains ShipTo information as well.

Branching to that page is controlled by the presence of a particular value in the BulkID field of a Product Record. Specifically, a "1" in that field causes a VBScript statement in ShipTo.asp to branch to an Execute statement that invokes Bulk.asp script. Bulk.asp presents an array of up to eight levels of discounts where both the discount and the number of products required to qualify for the given discount is provided. Information to display on the Web page come from a Bulk Table includes:
a) ProdID
b) BlkLv1–BlkLv8—number of products required for discount
c) DiscP1–DiscP8—Discount for level After selecting Bulk number of products, the Buyer continues with the process that is invoked by Bulk.asp. The Bulk.asp script writes and sends to the Buyers Browser a locale-specific Web page that includes obtaining the ShipTo information and quantity Information. The Web page generated invokes a script that sets all of the information received from this form into session variables.

Bulk.asp is Buyer's locale specific. It creates and sends to the Buyer's Browser a Web page with the following features and functions:

7) Bulk.asp obtains quantity and discount information from the Bulk table using ProdID.
8) Bulk.asp sends a locale-specific HTML Web page that occupies Frame V, replacing the display of products that were in Frame V. Bulk.asp caches the contents of Frame V display so that the display can be presented again should the Buyer later choose to return to shopping. The new Web page includes a (a) ShipTo Data Entry and (b) quantity selection choices with associated discounts that are sent to the Buyer's Browser where shipping information includes: (1) quantity of an ordered Product (ProdNo), (2) ShipTo Address, (3) ShipTo City, (4) ShipTo State/Province, (5) ShipTo Country, and (6) ShipTo Postal Code.
9) Bulk Information includes an array, one discount level on each line, (1) Product Title (2) Discount percentage, (3) Required number of products for Level, and price discount level. Text is in the language specific to the Buyer's locale.
10) Each discount level is profiled on separate lines and an HTML Form is provided for the Buyer to enter the number of products selected.
11) Buyer's submission using the Post method returns the BulkID, and the product values. Post submission process includes the ReBulk.asp file name.
12) ReBulk.asp script contains the variable information contained in the request.form collection, BulkID, Discount, and ProdID.
13) After choosing a quantity, the Buyer clicks on "Submit." This event invokes a Form-submission procedure that returns a Form collection to the server, including the selected quantity chosen from the Form sent by Bulk.asp. This action invokes the ReBulk.asp script.
14) ReBulk.asp script obtains the Form Collection information from Form submission, stores the information in the transaction table, and sets the captured information in session variables.
15) ReCustom invokes an execute command to initiate a locale specific Carrier.asp from a locale-specific folder.

Checkout

When the Buyer clicks on the "Go to Checkout" checkbox, the Buyer's screen no longer contains any of the frames described above. At this point, the Buyer begins to see Web pages that are designed to accomplish the following goals:
1) collect information concerning the Buyer's name, address, and ways to contact the Buyer,
2) allow the Buyer to review and edit details of the transaction prior to a final approval by the Buyer, and
3) connect the Buyer to a payment gateway that allows secure payment by the Buyer to complete the purchase of the selected product(s).

While accomplishing the above stated goals, other stated goals are pursued to make checkout procedures as quick, clear, and generally Buyer-friendly as possible. To accomplish these goals, certain practices and guidelines are followed:
1) The Buyer is given a message summarizing of the steps that will be completed in the checkout process. The message will be brief, friendly, clear, and encouraging.
2) Information is offered to answer questions regarding privacy and security.
3) The Buyer is assured that details of the transaction can be modified during the checkout process.
4) Required information is clearly labeled as such.
5) Though drop-down menus are used to standardize input to avoid ambiguities and misspellings, alternate entry methods (e.g., text box entry) allow the Buyer to provide information not accommodated in a drop-down menu.
6) The Buyer is encouraged during the checkout process with messages, where appropriate, like "You are almost done!"
7) In instances where information needed has probably already been given, the Buyer will see the information asked for already pre-entered in a form, needing only to be submitted by the Buyer (assuming it does not need to be edited by the Buyer). For example, the Buyer's address is pre-entered, using the address provided in a previous step when the Buyer specified a ShipTo destination.

The "internationalization" technology to implement checkout procedures across barriers of languages, cultures, and nations is not well known. Therefore, those procedures are described in some detail below. It should be understood that those procedures, in all cases, implement not only internationalization goals but also all of the Buyer-friendly practices and guidelines detailed above. The art needed to implement the Buyer-friendly practices and guidelines is conventional and well known, thereby needing no further elaboration. Though those procedures are not elaborated upon, they are manifest throughout the checkout process.

Clicking on "Go to Checkout" invokes the first of a series of locale-specific scripts that provide interactive Web pages during the checkout process. The same method is employed here are has been described extensively in prior sections—the method of using locale-specific scripts of the same name but in different versions and placing those versions in folders that include LCID values in the folders' addresses.

InfoState.asp is the first of two scripts to obtain Customer Information. InfoState.asp is invoked in response to the Buyer clicking on "Go to Checkout." InfoState.asp collects (a) the Buyer's name and (b) the Buyer's State/Province from a drop-down menu. (The Buyer can correct the country, assumed by the Buyer's LCID value collected in a prior step, if it has been wrongly assumed.) Should the Buyer not be in the assumed country based on the locale of the Referral Website, the Web page delivered allows the Buyer to correct the assumption. In that case the Buyer simply chooses to enter the correct country in an alternate menu presented on the page. When that option is taken, the submission leads to a corrected InfoState page, absent the country menu.

The second script, Infocity.asp, is invoked upon Form Post submission the first one, InfoState. InfoCity.asp is a script that presents choices of City in a drop-down menu as "Children" of the State/Province specified in the prior step.

This method avoids problems in delivery due to buyer's entering misspellings. Locale-specific names for cities, states, and provinces are obtained from LCID-specific Place Name Tables. International standards for addressing are used.

The technology used for the interactive Web pages in this section is familiar from prior descriptions and need only be described in outline.

1) A Buyer's checking the "Go to Checkout" checkbox in the OFISC, triggers an HTML Form submission, using a Post method. That method involves (a) sending a Form Post submission for a Checkout Request that is received by the server that (b) invoking InfoState.asp that is found in a locale-specific folder address. (The Country is known from Buyer's locale.)

2) InfoState.asp obtains session variables including TransID and the StateID from the Request.Form collection.

3) InfoState.asp script writes and sends to Buyer a Web page, containing an HTML table with an embodied Form, to obtain the following information: Name, State/Province, and Email address information. The information is obtained via a sequence of interactive Forms submissions. A drop-down menu for State/Province is sent in a Web page for selection, which are those for the particular country as identified by the Buyer's locale. This country name is written in the Form delivered to the Buyer by InfoState.asp. The drop-down menu in the Web page is produced from an ADO call to a Stored procedure having an SQL statement that obtains a Recordset from a global State/Province Table. Buyer's LCID is used to select the result. A VBScript procedure is used to assemble the Recordset returned from the stored procedure into the HTML for the drop-down menu. A JScript procedure assists in the Form-submission process in the manner previously described. The design of the Web page includes a JScript procedure and which monitors an event consisting of Buyer's clicking on the State/Province choice.

4) The Buyer selects from a corresponding drop-down HTML Form's menu to obtain the StateID paired with the viewed State/Province. The displayed values are those that are germane to the Country of the Buyer's locale.

5) The form also contains fields for the Buyer to enter name and Postal Code.

6) Buyer's clicking on the State/Province causes an embedded Form to perform an HTML FORM submission containing InfoCity.asp script name and the locale-specific folder address where the script is obtained by the server. The server invokes a locale-specific InfoCity.asp script and its locale-specific folder.

7) InfoState.asp creates session variables for Buyer's selected or entered StateID, BuyEmail, and Name. StateID identifies the selected State or Province. This information is used to update the Transaction Table.

In operation, Buyer's choosing a State/Province in the HTML menu triggers an HTML Form Post submission. InfoCity.asp script is obtained by the server from the locale-specific folder containing a locale-specific version of the InfoCity.asp script. InfoCity.asp presents choices for City in a drop-down menu as "Children" of the State/Province selected in the prior menu. Steps are as follow:

1) InfoCity.asp obtains session variables, retrieves information from Request.Form, and places received Form information in session variables.

2) InfoCity.asp script writes and sends to a Buyer a Web page to obtain the Buyer's City in a manner similar to the InfoState.asp procedure described above.

3) The design of the Web page includes a JScript procedure and which monitors an event consisting of Buyer's clicking on the City choice. Also required is that the Buyer enter a street address and postal code in fields in a Form.

4) Viewing the Web page, the Buyer uses a drop-down HTML Form's menu to obtain the City from among all the cities belonging to the State/Province. The drop-down menu in the Web page is produced from an ADO call to a Stored procedure having an SQL statement that obtains a Recordset from a global City Table. Buyer's LCID and StateID are used to select the result. A VBScript procedure is used to assemble the City Recordset returned from the stored procedure into the HTML for the drop-down menu for the page sent to the Buyer.

5) After the street address has been entered, the Buyer's clicking on the City causes an embedded Form to perform a URI submission containing Approval.asp script name and the locale-specific folder address where the script is obtained.

6) The design of the embedded form enables the triggered event to send the following to the server: (a) a FORM Post submission identifying a locale-specific Approval.asp script and its locale-specific folder address where Approval.asp is obtained, (b) the Buyer's street address, and (c) CityID identifying the City within the previously selected State/Province, and Postal Code.

In operation, the Buyer's clicking on a City in an HTML menu presented to Buyer's Browser in full screen, triggers an HTML Form submission, using Post method. Doing so sends an HTTP Request for a Buyer's approval Form, via a Form Post Submission containing the Approval.asp script name and the locale-specific folder address in which to obtain a locale-specific version of the Approval.asp script. Approval.asp is a script to obtain a Buyer's approval of a transaction. Steps are as follow:

1) Approval.asp obtains session variables including TransID, ProdID's for all products in the Transaction, and Buyer's Name, Street Address, CityID, StateID, CountryID, and BuyEmail.

2) Approval.asp creates Session variable for CityID from a Request.Form Collection created from the City.asp script.

3) Approval.asp writes and sends to the Buyer's Browser a Web page that includes a Product Array display of selected product information obtained from the Transaction Table for TransID and ItemID values of the corresponding Session Variable. The products are listed in the same order as they were placed in the OFISC. The Product Array display includes the same information as in the OFISC with the additional information as to the origin of the Shipment, identified in the Ship-From field of a record in the Fulfillment Table, accessed via the FulfillID value from the locale-specific Product record. The Product Array display also includes the name of the Carrier, which is obtained from the Carrier Table using the CarrierID value from the locale-specific Product record.

4) Approval.asp updates the Customer Table by adding a new record with the key field value of BuyerID and session variables for Name, Street Address, CityID, StateID, Postal Code, CountryID, and BuyEmail information from the previous step. These are established as session variables.

5) Buyer's checking an "Approved" Checkbox on the Product Approval Page triggers an HTML Form submission, using Post method, sending an HTTP Checkout Request containing Checkout.asp script name and the locale-specific folder address in which the server obtains and invokes a locale-specific version Checkout.asp script.

In operation, the Buyer's checking "Approved" results in an HTML menu being presented to the Buyer by Approval.asp script. A JScript procedure monitors an associated event and which triggers an HTML Form submission, using Post method, sending an HTTP Checkout Request. The Checkout.asp request is received by the server and invokes from the locale-specific folder Checkout.asp script. Checkout.asp script performs the following steps:

1) Session variables are obtained, including TransiD, ProdID's for all products in the Transaction, and Buyer's information: BuyerID, Name, Street Address, CityID, StateID, Postal Code, CountryID, and BuyEmail.

2) Taxes are obtained from an external Tax Computing Service for the Transaction Total in the Transaction identified by the TransID and ItemID values. A category code for tax classification, TaxClass, is supplied to the Tax Computing Service from the product record to enable the Tax Computing Service properly to determine the correct tax. A Tax interface is specific to each locale for obtaining taxes in the currency of the Buyer's locale. A Tax Table retains the master list of all tax classification codes for each LCID. Each locale may have one or more different kinds of taxes. The Tax Name Table includes fields of TaxID, TaxName, and LCID. Each TaxID is the identifier for a particular tax owed in the locale of the Buyer for the transaction identified by session's TransID. A separate Tax Table contains a separate record for each tax charged for each TransID/ItemID pair for the number of products ordered. The fields in this table include TaxAmt, LCID, TransID, and ItemID. The TotalTax is collected that is due on sales in the locale of the Buyer. The total Tax for the TransID is stored in the Transaction Total Table, described next, as TotalTax for the transaction.

3) A record is added to Transaction Total Table in the SQL Server Platform. That table stores the total of all product costs for a session's TransID. The Transaction Total Table includes the following fields: (a) TransID, (b) Transaction Total in Buyer's Locales Currency, (c) Transaction Total in Fulfillment Center Locales Currency, and (d) TotalTax, specified in the currency of the Buyer's locale.

4) Transaction Records are updated by adding the total product tax amount to the tax fields of the Transaction record for each TransID/ItemID record. Tax is added to the Transaction Total in the Transaction Total Table described above.

5) Checkout.asp writes and sends to the Buyer's Browser a pop-up window containing a locale-specific Payment Processing Service Approval Procedure. That Web page is sent via a secure Internet protocol and procedure to ensure that security is maintained. A locale-specific Payment Processing Service is selected to handle all transaction Payments in each locale.

6) Checkout.asp writes and sends a secure Payment Processing Service Interface Web page to the Buyer's Browser for the selected Payment Processing Service.

7) The Payment Processing Service Gateway's Form collects customer's financial information needed to process and obtain approval. The Payment Processing Service's Application Programming Interface (API) obtains information it needs to process the payment direct from the Buyer in a form designed and approved for that purpose. Checkout.asp supplies the Buyer's transaction information required by the Payment Center Gateway. This information includes the Transaction Total, including tax, for the Sessions TransID. Checkout.asp accesses the Transaction Table from the SQL Server Platform, using the TransID to obtain the Transaction's records. The Payment Processing Service returns an approval code.

8) Checkout merges the Buyer's Transaction and Customer Information (from Session Variables) into a Payment Processing Service's Interactive Form, as follows: Buyer's Name, Street Address, CityID, StateID, , Postal Code, CountryID, and BuyEmail. Checkout.asp also provides the Transaction Total.

9) The Buyer completes the Payment Processing Service's Interactive Form and engages in an interactive session over a Secure Connection relayed through the Global Store server. Upon the Buyer's acceptance of the Transaction and payment arrangements, Checkout.asp receives approval of payment for the Transaction. The Buyer is restored to this checkout process with an approval secured. The method of submission, formatting of data elements and so forth are prescribed by the Payment Processing Service's API specifications. Checkout.asp ASP script is structured, pursuant to the particular Payment Processing Service, to receive an approval for a purchase.

10) When an approval is received, Checkout.asp updates the Transaction Table record with a Payment Processing Service Approval Code. Checkout.asp also adds a record to the Status Code Table designating "Payment Made" and includes a date/time stamp for this transaction. Checkout.asp adds as escrow account number in an EscrAcct field for each transaction record. (The Status Code table is used by Customer Service to perform, automatically, certain functions triggered by the status code changing, as described in a following section.)

When a product is a digital product like a book, Checkout.asp invokes a method-specific download for electronic item(s). Electronic downloads are made from resident inventory using an Include ASP Script. That script is invoked by using an Include directive to (a) actuate a resident process, appropriate for the kind electronic sale (video, audio, etc.), and (b) create an authorization for accounting purposes with the vendor. Transfer of the product purchased completes the transaction (TransID/ProdID), triggering a change to a "delivered" status for the Status Code in the Status Code Record for the item. This process invokes a Form Post submission to a Deliver.asp script invoked by the server receiving the request. Deliver.asp obtains Request.Form collection to obtain the the status of the results of the electronic download. Deliver.asp the posts status to the Status Change Table.

Order fulfillment of physical items is made by each product's manufacturer. A Manufacturer's Order includes all products in the transaction from that manufacturer. A method to notify a manufacturer that a product has been purchase and needs to be shipped is described in the following section.

E-mail Notifications to Buyers and Manufacturers

Status Code triggers invoke automated HTML-encoded e-mail. An event that creates a new record in the Status Change Table also may trigger the sending of an informative email notification to a Buyer or manufacturer. The email is generated in a format and language suitable to the recipient's locale. In the event of a status code value for StatID in the Transaction Table changing, a new record is generated in the Status Change Table to record the change and the date and time of the change, using a constant format throughout all locales. As a specified code value changes, a monitoring Database procedure triggers a specific response. For instance, a status code change that shows a completed sale transaction triggers a notification of Confirmation of Purchase to be sent to a Buyer. At the same time, a Notification of Purchase is e-mailed to each manufacturer, that notification limited to the product(s) purchased from that specific manufacturer.

Technical Note: The monitoring procedure referred to above uses a stored SQL procedure that is automatically triggered on a timed maintenance by an ADO call from a Web server script. The stored SQL procedure returns a Recordset to the server script. That Record set is composed of pertinent records from the Status Change Table—records that were not collected since the last ADO call and which also meet other criteria. Those other criteria involve the values found in the StatID field for the recent records. The stored procedure returns those records having values that will trigger certain responses from the server script. Pertinent here are those responses wherein a locale-specific email message is sent to either the Buyer or manufacturer to inform the recipient of a salient status change. One such change would be the completion of a purchase.

Both the Confirmation of Purchase to Buyers and the Notification of Purchase to manufactures contain 1) a list of products and quantity purchased along with (when pertinent) size, color, options ordered, and discount for wholesale,
2) Purchase Order number for each product purchased,
3) ShipTo Address Information
5) Price for each item in the respective locales' currency,
6) Shipping Option selected for delivery,
7) Shipping Cost in respective currencies, and
8) Custom Order Options, and Date/Time (GMT)

Additional information is included in the e-mail to the Buyer, as follows:

1) Total Price, including Tax and Options,
2) clickable URL to a Personalized Web Page, described below,
3) Escrow information, and
4) advice that parcel tracking details will follow after the product is shipped. (E-mail is automatically generated and sent to a Buyer when the status code for each product belonging to a particular manufacturer has changed to a value indicative of a "shipped" status.)

All of the foregoing is sent to a Buyer in the National Language of the Buyer's locale.

Technical Note: A Buyer receives an email upon the event in the database that a Transaction Record in a Transaction Change Table shows a changed status for a transaction. An SQL procedure monitors changes in status of every transaction. A procedure generates an e-mail to send to a Buyer, the e-mail address having been collected as part of the checkout process. The script that generates the content of the e-mail uses a VBScript procedure's LCID-specific, E-mail.inc process, the same process as described above for the different Frames in the Locale-Specific Category Selection Panel. Here, where a multitude of these Includes are described, they are specific for (a) the buyer's locale, (b) the Status Code event that changes in the database, and (c) the SQL procedure designed to monitor changes in the specific Status Code that triggers the e-mail response.

An LCID-specific Include server-script obtains the appropriate identifiers and other information to be bound into HTML for inclusion into an e-mail body. For example, given that a Status Code for a transaction changes to show acceptance of a Buyer's payment by a Payment Gateway and an e-mailed Confirmation of Purchase is required, a process is triggered for 1) finding an Include script for the locale, the script binding transaction-related data associated with the event (ProdID, Prod Title, Total Price, etc.) and
2) implementing server-side Includes that provide locale-specific National Language text strings bound into a script that generates the HTML for inclusion in the Body of the e-mail message.

Methods to generate proper HTML-coded content in all locales have been described in detail in previous sections. (For example, UTF-8 is used as the character-set for encoding information.) Because e-mail accommodates HTML, the same methods do not need to be repeated here.

Monitoring Received Email Notifications

Email may be processed to generate automatic responses like, for example an email response in return, a well known technology. That is done at the Global Store in response to Buyer's email messages, a way of immediate confirming that their email has arrived and that a response will be given shortly to their specific concern. In that case, the Buyer's email is added to the database to be processed by Customer Service Representatives.

Another response would be an automatic email message to a Buyer when an email notification came from a manufacturer that a purchased product had been shipped. That kind of incoming email is used in the Global Store to update the Transaction Table, monitor service to Buyers, and trigger appropriate email messages to Buyers.

Technical Note: Automatic responses to incoming messages can be most useful when the incoming message is in a standard format. Email from manufactures comes in a specified format to a specified account in the Email Exchange Server Platform 1560. Use of those communication standards allows automatic update when, for example, a message arrives documenting the shipment of a purchased product. That kind of email is process by a monitoring script which updates StatID information in the Transaction Record and in the Status Change Table. That record is accessed by using TransID and ItemID from the email—a standard for communications that is part of the email format specified for manufacturer's notifications.

Personalized Customer Serve Web Page

Following a purchase of a product, a Buyer is able to view a Personalized Customer Serve Web Page (PCSWP). The Buyer is provided with a URL for the page, sent in an HTML-version email that is automatically sent following a status code change signaling a completed purchase.

The PCSWP delivers individualized customer service information. The purpose of the PCSWP is to allow Buyers to find comprehensive customer service information at one easily accessed location. It is dynamically generated, run-time, by a Buyer's clicking on a hyperlink that includes a server-side script's file name. The hyperlink is included in the email described above.

Information is presented in two frames (Frame I and Frame II) within a Frameset. The left frame, Frame I, consists of a Directory of customer information services. Each service in the Directory consists of an embedded HTML form that, when selected, submits an HTTP "Post" request to the server. Each request specifies a server script that generates a locale-specific response that is sent to the Frame II target. The LCID value needed to obtain a locale-specific response from the server script is obtained from a Customer's record.

The localized Frameset is sent to the Buyer to display all of the Customer Information Services content described below. It consists of the two open frames, Frames I and II. The left frame, Frame I, comprises about 20% of the screen. The right frame, Frame II, comprises the rest. Frame I, which contains a localized Directory of services, scrolls top to bottom; and each Directory item provides a localized Form submission for a Web page to be delivered to the larger Frame II. Each selectable item in the Directory uses a localized Include ASP Script to generate content targeted to Frame II.

The methodology used for implementation of a Frameset and server scripts needed to generate and send Web pages in each locale has been described in prior sections. For example, using LCID-specific server-side Includes containing localized ASP scripts to produce frame-designated results are technical methods already amply described before, and they need not be repeated here.

Information, described with a title in Frame I and used selectively to populate Frame II, includes the following: (a) Current Order Status of products, including delivery, (b) hotlinks to connect with a Carrier's Parcel Tracking Service and automatically obtain Parcel Status from the Carrier for each parcel, (c) Return Policies and Procedures, (d) Past Transactions of prior purchases, (e) Product Information Updates, (f) Global Directory of local product-specific Repair Centers that are searchable for products purchased, (g) Directory of Customer Service Contacts—E-mail addresses, phone numbers, hotlinked Internet Telephony addresses, etc., (h) Global Store Directory, (i) status of products that have been ordered for custom manufacture, (j) links to products, accessories, and services that are related to a purchase product and that the Buyer may wish to purchase, and (k) links to any customer retention programs of the Global Store in which the Buyer participates (or may wish to).

Most of the above content is self-explanatory. Additional technical detail is provided, as follows, to show how dynamic, content-specific Web pages are used to populate Frame II.

Technical Note: Current Order Status is delivered to Frame II in a locale-specific Web page produced by a server-side, Buyer's-LCID-specific Include ASP script. That script provides an HTML-bound tabular presentation of all products involving outstanding deliveries for all transactions. The ASP script automatically obtains the status in tabular form for each undelivered product. The status is provided for each product in the table using information from the Manufacturer's Carrier. Results of embedded parcel tracking results are used to update the product's status code.

A link on the Personalized Customer Service Web Page, in the language of the Buyer, provides the hotlink to the Carrier's parcel tracking service. The hotlink uses an embedded Tracking Number to access the Carrier's parcel-tracking status page for a subject parcel. The Tracking Number is conveyed automatically to the Carrier's traffic service. (This functionality is all transparent from the Buyer's PCSWP.)

A locale-specific Past Transactions Web page, produced by a server-side, LCID-specific Include ASP script, provides an HTML-bound tabular presentation of all product orders found to have a "delivered" status in an Order Status Code table. Links are provided to additional information for each product, as available.

A Buyer may check the status of products ordered for custom manufacture but not yet shipped. That information is sent in a locale-specific Web page produced by a server-side, LCID-specific, Include ASP script to provide an HTML-bound tabular presentation of all products found to have been ordered for manufacture but not yet shipped.

Escrow Process

An Escrow process is a part of the purchase transaction for all purchases. The Global Store holds each payment in escrow until the buyer receives the shipment. The Buyer is granted three days after delivery to inspect the product and to initiate a return process if the product is unsatisfactory.

After funds are collected from during the purchase process, they placed in a special escrow account at the Global Store pending expiration of the three-day period for inspection.

The Global Store offers to the buyer the escrow process to help Buyers be more comfortable in making purchases internationally. The escrow process is facilitated by collection and monitoring of the following data: (a) assigned escrow number, (b) Transaction ID, (c) Carrier ID, (d) Carrier Tracking number, and (e) Payment Gateway Approval.

Settlement Process

A Settlement process is conducted periodically whereby manufacturers are credited with net receipts for a manufacturer's product after a product is delivered and after there is no outstanding or open escrow. (Returns are handled on an exception basis.)

The Global Store debits from gross receipts for each transaction the commissions owed to the Referral Website and to the Global Store. The Manufacturer is reimbursed for shipping in the amount collected from a Buyer.

For a Manufacturer's account at the Global Store accounting is conducted in the language specified by the manufacturer, and duplicate entries in the books of the Global Store are conducted in English. Settlement feeds into the Accounts Payable. After status code changes reflect satisfactory delivery of a product, payments are made by Electronic Funds Transfer from Global Store accounts to Manufacturers and the Referral Websites.

An assumption is made that the funds received from buyer's purchase are automatically converted on the day of the buyer's purchase at the current exchange rate.

What is claimed is:

1. A method for effecting global e-commerce marketing and sales of manufacturers' products, the method comprising:

placing, on Web pages of referral Websites that use a variety of languages and serve geographic locales throughout the world, embedded HTML forms that are submitted by buyers to request information about products from at least one manufacturer;

storing one locale identifier value at each referral Website among said referral Websites, where said locale identifier is a numerical value that is unique among many numerical locale identifiers that are assigned to the pairings of specific geographic locales and specific languages commonly used in those geographic locales, and where the geographic locale is the country served by said referral Website and where the referral Website is rendered in the language commonly used in that one geographic locale among said geographic locales;

storing in a relational database more than one natural language, locale-specific version of marketing information about each product of said products, where each stored version of marketing information is related to a stored value that is one of said locale identifier values and where said value identifies the language of the stored version of marketing information;

storing identifier values for each said product so that each said product in said database is identified by a product identifier value, a category identifier value, a family identifier value, a group identifier value, and a department identifier value;

storing a set of SQL procedures in said database, where each procedure can be used to retrieve one locale-specific language version of said stored marketing information about a product;

storing, in a server, a set of locale-specific server scripts and style sheets that are selectively used to generate locale-specific e-commerce Web pages that display said translated marketing information;

displaying to a Buyer, who is using a Web browser and is connected by the Internet to one referral Website of said referral Websites, one HTML form of said HTML forms that is manually activated to send a request to receive marketing information about a department of products, where the request comprises, first, a department identifier value that identifies the products that are a subject of the marketing information request by said buyer, and, second, a locale identifier value for a specific locale that is served by the referral Website;

receiving at said server, connected to said database, said request from said Buyer, where said request includes said department identifier value and said locale identifier value;

delivering in response to the buyer's request a series of interactive menus by which the Buyer drills down through a hierarchy of department, group, family, and category to select for viewing product information about a particular product;

processing, by said server, said request for said marketing information about said product, where a product identifier value and said locale identifier value are used to select one SQL procedure of said set of SQL procedures to retrieve said one locale-specific language version of marketing information from said database;

generating an e-commerce Web page by using said one locale-specific language version of marketing information in conjunction with using one server script and one style sheet from said set of locale-specific server scripts and style sheets;

transmitting from said server said e-commerce Web page for display on said Buyer's said Web browser from which said request originated, where the Web page contains marketing information that includes an offer to sell said product for a certain price as expressed in a currency that is commonly accepted in the locale identified by said locale identifier value and also contains an interactive link that is manually activated by said Buyer to order a purchase of said product;

transmitting from said Web browser to said server said purchase order;

collecting payment for said purchase of said product at a Website enabled for processing of e-commerce purchase transactions; and notifying said manufacturer that said purchase of said product has been made by said Buyer.

* * * * *